(12) United States Patent
Kono et al.

(10) Patent No.: US 8,024,603 B2
(45) Date of Patent: Sep. 20, 2011

(54) DATA MIGRATION SATISFYING MIGRATION-DESTINATION REQUIREMENTS

(75) Inventors: Yasutaka Kono, Yokohama (JP); Yukinori Sakashita, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 402 days.

(21) Appl. No.: 12/254,270

(22) Filed: Oct. 20, 2008

(65) Prior Publication Data

US 2010/0049917 A1     Feb. 25, 2010

(30) Foreign Application Priority Data

Aug. 25, 2008   (JP) .................................. 2008-215446

(51) Int. Cl.
*G06F 11/00* (2006.01)
(52) U.S. Cl. .......................................... 714/6.2; 714/6.3
(58) Field of Classification Search .................. None
See application file for complete search history.

(56) References Cited

U.S. PATENT DOCUMENTS

| | | | | |
|---|---|---|---|---|
| 4,310,883 | A  * | 1/1982 | Clifton et al. ........................ | 1/1 |
| 5,790,886 | A  * | 8/1998 | Allen ................................. | 710/5 |
| 6,836,832 | B1 * | 12/2004 | Klinkner ....................... | 711/170 |
| 7,035,972 | B2 * | 4/2006 | Guha et al. ..................... | 711/114 |
| 7,146,522 | B1 * | 12/2006 | Rowe et al. ....................... | 714/6 |
| 7,913,043 | B2 * | 3/2011 | Helliker et al. ................ | 711/162 |
| 2003/0182593 | A1 * | 9/2003 | Emberty et al. ................... | 714/6 |
| 2005/0160305 | A1 * | 7/2005 | Soejima ............................ | 714/2 |
| 2006/0031594 | A1 * | 2/2006 | Kodama ............................ | 710/5 |
| 2007/0143367 | A1 * | 6/2007 | Schutzman et al. .......... | 707/203 |
| 2007/0233987 | A1 | 10/2007 | Maruyama et al. | |
| 2007/0245110 | A1 * | 10/2007 | Shibayama et al. .......... | 711/165 |
| 2009/0037679 | A1 * | 2/2009 | Kaushik et al. ............... | 711/162 |

FOREIGN PATENT DOCUMENTS

JP        2007-279845        10/2007

* cited by examiner

*Primary Examiner* — Gabriel L Chu
(74) *Attorney, Agent, or Firm* — Brundidge & Stanger, P.C.

(57) ABSTRACT

The invention is directed to a storage system including a storage subsystem providing a data storage service to a host computer, and a management device managing the storage subsystem. The management device issues a command to a controller in the storage subsystem for migrating data on a migration-source volume to a migration-destination volume in accordance with a predetermined task. When the migration-destination volume is not available for use for some reason, and when the data migration is not completed normally, the management device searches an alternative volume in accordance with migration-destination requirements including essential and arbitrary requirements, and then issues a command for data migration to thus found alternative volume. With such a configuration, even if a migration-destination volume is not available for use for some reason during data migration, any other volume can be used as a migration destination in accordance with the migration-destination requirement(s).

2 Claims, 29 Drawing Sheets

| COMMAND DETAIL ID | MIGRATION-SOURCE DEVICE ID | MIGRATION-SOURCE LUN | MIGRATION-DESTINATION DEVICE ID | MIGRATION-DESTINATION LUN |
|---|---|---|---|---|
| 1 | USP V.0 | 4 | USP V.0 | 3 |
| 2 | USP V.0 | 5 | USP V.0 | 0 |

FIG. 6

| MIGRATION TASK ID 601 | MIGRATION-SOURCE DEVICE ID 602 | MIGRATION-SOURCE LUN 603 | MIGRATION-DESTINATION REQUIREMENT ID 604 | MIGRATION-DESTINATION DEVICE ID 605 | MIGRATION-DESTINATION LUN 606 | TASK EXECUTION DATE AND TIME 607 |
|---|---|---|---|---|---|---|
| 1 | USP V.0 | 4 | REQUIREMENT 1 | USP V.0 | 3 | 08/06/12 10:00 |
| 2 | USP V.0 | 5 | REQUIREMENT 2 | USP V.0 | 0 | 08/06/30 9:00 |
| 3 | USP V.0 | 6 | REQUIREMENT 3 | - | - | 08/07/01 12:00 |

| MIGRATION-DESTINATION REQUIREMENT ID | MIGRATION-DESTINATION REQUIREMENT | ESSENTIAL FLAG | MIGRATION COMPLETION DATE AND TIME |
|---|---|---|---|
| REQUIREMENT 1 | CAPACITY ≧ 10GB | Yes | 08/06/15 10:00 |
| | RAID LEVEL = RAID5 | No | |
| REQUIREMENT 2 | DISK TYPE = FC | Yes | 08/06/30 10:00 |
| REQUIREMENT 3 | CAPACITY ≧ 10GB | Yes | 08/07/10 12:00 |

FIG. 8

| CONDITION ID | MIGRATION TASK ID | EXECUTION CONDITION | TASK EXECUTION DEADLINE |
|---|---|---|---|
| 1 | 4 | FAILURE RECOVERY OF DISK 5 | 08/06/15 10:00 |

FIG. 10

- MIGRATION SOURCE
  - DEVICE ID: USP V.0 / USP V.1 / HDS9570V.0
  - LUN: ● 0 / ○ 1 / ○ 2

- MIGRATION SOURCE
  - DEVICE ID: USP V.0 / USP V.1 / HDS9570V.0
  - LUN: ○ 0 / ● 1 / ○ 2

- TASK EXECUTION DATE AND TIME
  - YEAR: 2008 / 2009 / 2010
  - MONTH: 01 / 02 / 03
  - DAY: 01 / 02 / 03
  - TIME: 10:00:30

OK   Cancel

FIG. 11

MIGRATION-DESTINATION REQUIREMENT

| VOLUME ATTRIBUTE | CONDITION | REQUIREMENT | ESSENTIAL |
|---|---|---|---|
| CAPACITY ▼ | = ▼ | 10GB | ✓ |
| RAID LEVEL | ≥ | | |
| DISK TYPE | ≤ | | |
| | = | | |

ADDITION OF REQUIREMENT

TASK EXECUTION DATE AND TIME

| YEAR | MONTH | DAY | TIME |
|---|---|---|---|
| 2008 ▼ | 01 ▼ | 01 ▼ | 10:00:30 |
| 2009 | 02 | 02 | |
| 2010 | 03 | 03 | |

OK  Cancel

| COMMAND DETAIL ID | MIGRATION-SOURCE DEVICE ID | MIGRATION-SOURCE LUN | MIGRATION-DESTINATION DEVICE ID | MIGRATION-DESTINATION LUN | POWER SAVING Yes or No |
|---|---|---|---|---|---|
| 1 | USP V.0 | 4 | USP V.0 | 3 | Yes |
| 2 | USP V.0 | 5 | USP V.0 | 0 | No |

FIG. 27

| DEVICE ID | LUN | CONTROL DEVICE ID | VIRTUALIZED DEVICE ID | DISK ID | POWER SAVING FUNCTION Yes or No | VOLUME ATTRIBUTE ||| STATE |
|---|---|---|---|---|---|---|---|---|---|
| | | | | | | CAPACITY | RAID LEVEL | DISK TYPE | |
| USP V.0 | 0 | 0 | - | 0, 1, 2 | | 15GB | RAID5 | FC | NORMAL |
| USP V.0 | 1 | 0 | - | 2 | | 20GB | JBOD | SATA | NORMAL |
| USP V.0 | 2 | 1 | AMS.0 | - | | 10GB | RAID1 | SATA | NORMAL |
| USP V.0 | 3 | 1 | AMS.0 | - | | 10GB | RAID5 | FC | NORMAL |
| AMS.0 | 0 | 0 | - | 0, 1, 2 | | 10GB | RAID5 | FC | NORMAL |
| AMS.0 | 1 | 0 | - | 3, 4 | | 10GB | RAID1 | FC | NORMAL |
| AMS.0 | 2 | 1 | - | 5 | | 10GB | JBOD | SATA | NORMAL |

FIG. 28

| MIGRATION-DESTINATION REQUIREMENT ID (701) | MIGRATION-DESTINATION REQUIREMENT (702) | ESSENTIAL FLAG (703) | MIGRATION COMPLETION DATE AND TIME (704) |
|---|---|---|---|
| REQUIREMENT 1 | CAPACITY ≧ 10GB | Yes | 08/06/15 10:00 |
| | RAID LEVEL = RAID5 | No | |
| REQUIREMENT 2 | DISK TYPE = FC | No | 08/06/30 10:00 |
| | POWER SAVING FUNCTION Yes or No = Yes | Yes | |
| | POWER SAVING Yes or No = Yes | Yes | |
| REQUIREMENT 3 | CAPACITY ≧ 10GB | Yes | 08/07/10 12:00 |

2800

DATA MIGRATION SATISFYING MIGRATION-DESTINATION REQUIREMENTS

CROSS REFERENCES TO RELATED APPLICATIONS

This application relates to and claims priority from Japanese Patent Application No. 2008-215446, filed on Aug. 25, 2008, the entire disclosure of which is incorporated herein by reference.

BACKGROUND OF THE INVENTION

1. Field of the Invention

The present invention relates to a storage system and a data migration method therefor and, more specifically, to a data migration technology between logical volumes.

2. Description of the Related Art

With the recent increase of the data processing amount in a computer system, a storage device, i.e., storage subsystem, in charge of data storage has been increased in capacity. Accordingly, such technologies as SAN (Storage Area Network) and NAS (Network Attached Storage) have become widely used. With these technologies, the system management can be performed with flexibility and efficiency with a storage device connected to a plurality of host computers over a network.

In recent years, the demand has been growing for reduction of the operating cost of the storage device. For reduction of the operating cost as such, data life cycle management is a solution. With data life cycle management as such, data management is so performed that data is reallocated to any appropriate storage device in accordance with the storage date and time of data and the use frequency thereof, for example. For implementing such data life cycle management, data migration is known as a technology of migrating data on a volume in the storage device to another volume therein.

With such data migration, typically, the storage device firstly copies data on a volume being a migration source to a volume being a migration destination, and then deletes the data on the migration-source volume before changing an access destination from a host computer to the migration-destination volume. During such data migration, if a writing request comes from the host computer to the migration-source volume, the storage device stores data requested for writing in a cache memory as update data, and then reflects the update data to the migration-destination volume, thereby keeping the consistency among the volumes.

Patent Document 1 (JP-A-2007-279845) below describes the technology of reallocating a volume to another volume in accordance with migration essential conditions. To be specific, for reallocating a first volume in a first storage tier into a second storage tier, the storage system of Patent Document 1 operates as below. That is, if the second storage tier includes no second volume satisfying the migration essential conditions to serve as a migration destination for the first volume, the storage system temporarily allocates any of volumes in a third storage tier satisfying the migration essential conditions, i.e., a third volume, to the second storage tier so that the first volume is reallocated to the third volume.

SUMMARY OF THE INVENTION

In Patent Document 1, when the storage tier being a migration destination includes no volume satisfying the migration essential conditions, a volume in any other storage tier satisfying the migration essential conditions is temporarily allocated to the migration-destination storage tier so that the temporarily-allocated volume can be used as a migration-destination volume.

The problem with Patent Document 1 is that, however, when the temporarily-allocated volume is not perfectly satisfying the requirements intended by a user, i.e., system manager, data migration has to be performed from the start again. Moreover, when the intention of the system manager is not reflected in great detail in the requirements, a determination cannot be made whether the data migration is required again or not. As a result, inconveniently, any necessary data migration is not performed again but any unnecessary data migration is.

In consideration thereof, an object of the invention is to provide a storage system in which, even if a migration-destination volume is not available for use for some reason during data migration, any other volume can be used as a migration destination based on migration-destination requirements.

Another object of the invention is to provide a storage system that can perform again any needed data migration by using the migration-destination requirements corresponding precisely to the intention of a system manager, and can also prevent any unnecessary data migration from being performed again.

To achieve such objects, the invention has the features of selecting, when a migration-destination volume is not available for use for some reason during data migration, any other volume as a new migration destination based on any predetermined migration-destination requirements.

That is, a first aspect of the invention is directed to a storage system that includes: at least one storage subsystem that provides a data storage service to a host computer; and a management device that manages the at least one storage subsystem. In the storage system, the at least one storage subsystem includes: a disk array including a plurality of hard disk drives forming a plurality of logical volumes; and a controller that controls an access to the disk array based on an access request coming from the host computer. The management device includes: migration task information including a first task that defines data migration from a first logical volume being any one of the plurality of logical volumes to a second logical volume being any other one of the plurality of logical volumes; and migration-destination requirement information including at least one migration-destination requirement about the first task.

The management device issues, in accordance with the first task found in the migration task information, to the controller of the at least one storage subsystem including the first logical volume, a command for executing the first task. The management device also specifies, when determining that the first task is not normally completed by the controller, based on the migration-destination requirement information, a third logical volume for a replacement of the second logical volume, enters, into the migration task information, a second task defining data migration from the first to third logical volume, and issues, in accordance with the second task found in the migration task information, to the controller of the at least one storage subsystem including the first logical volume, a command for executing the second task.

A second aspect of the invention is directed to a data migration method in a storage system including at least one storage subsystem that provides a data storage service to a host computer, and a management device that manages the at least one storage subsystem. The data migration method includes the steps of: keeping, by the management device, migration task information including a first task defining data migration from a first logical volume to a second logical volume; keeping, by the management device, migration-destination requirement information including at least one migration-destination requirement about the first task; issuing, by the management device, in accordance with the first task found in the migration task information, to a controller of the at least one storage subsystem including the first logical volume, a command for executing the first task; specifying, by the management device, when determining that the first task is not normally completed by the controller, based on the migration-destination requirement information, a third logical volume for a replacement of the second logical volume; entering, by the management device, into the migration task information, a second task defining data migration from the first to third logical volume; and issuing, by the management device, in accordance with the second task found in the migration task information, to the controller of the at least one storage subsystem including the first logical volume, a command for executing the second task.

According to the aspects of the invention, even if a migration-destination volume is not available for use for some reason during data migration, any other volume becomes available for use as a migration destination based on migration-destination requirements. Moreover, because the migration-destination requirements include both essential and arbitrary requirements, any necessary data migration is performed again without fail, and any unnecessary data migration can be prevented from being performed again.

These and other technical features and advantages of the invention will become more apparent from the following detailed description of the invention when taken in conjunction with the accompanying drawings.

BRIEF DESCRIPTION OF THE DRAWINGS

FIG. 6 is a diagram showing an exemplary migration task table in the management device of the first embodiment of the invention;

FIG. 7 is a diagram showing an exemplary migration-destination requirement table in the management device of the first embodiment of the invention;

FIG. 8 is a diagram showing an exemplary task execution condition table 800 in the management device of the first embodiment of the invention;

FIG. 10 is a diagram showing an exemplary migration task input screen displayed on a user interface in the management device of the first embodiment of the invention;

FIG. 11 is a diagram showing a migration-destination requirement input screen displayed on the user interface in the management device of the first embodiment of the invention;

FIG. 27 is a diagram showing an exemplary volume management table in the management device of the second embodiment of the invention;

FIG. 28 is a diagram showing an exemplary migration-destination requirement table in the management device of the second embodiment of the invention;

DESCRIPTION OF THE PREFERRED EMBODIMENTS

Described next are embodiments of the invention by referring to the accompanying drawings.

First Embodiment

Figure 1:
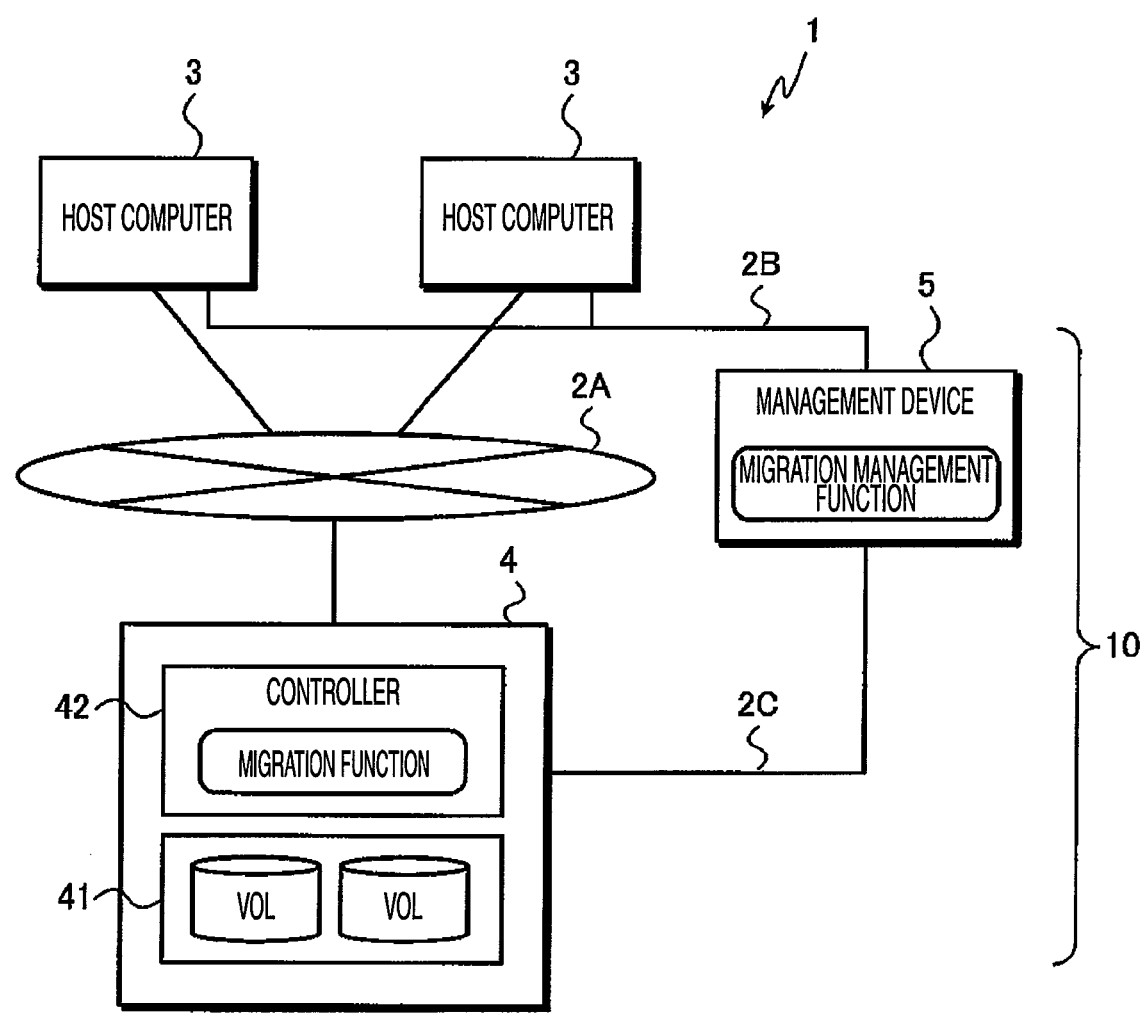
FIG. 1 is a block diagram showing the configuration of a computer system in a first embodiment of the invention.

FIG. 1 is a block diagram showing the configuration of a computer system in a first embodiment of the invention. As shown in FIG. 1, a computer system 1 is configured to include one or more host computers 3 and one or more storage subsystems 4, which are connected together over a network 2A such as SAN (Storage Area Network). The computer system 1 also includes a management device 5. The management device 5 is connected to the host computer(s) 3 and the storage subsystem(s) 4 over a management network 2B and 2C such as LAN (Local Area Network). In view of the host computer(s) 3, the storage subsystem(s) 4 and the management device 5 form a storage system 10.

The host computer 3 is provided with hardware resources including a processor, a main memory, a communications interface, a local input/output device, and others, which are connected together via an internal bus. The host computer 3 is also provided with software resources (not shown) including a device driver, an operating system (OS), application programs, and others. With such a configuration, the host computer 3 runs various types of application programs under the control of the processor, and in corporation with the hardware resources, performs any desired process while accessing the storage subsystem(s) 4.

The storage subsystem 4 is a storage device providing a data storage service to the host computer(s) 3. The storage subsystem 4 is typically configured to include a disk array 41, and a controller 42. The disk array 41 includes a large-capacity storage medium such as hard disk drive for storage of data, and the controller 42 controls the disk array 41.

The management device 5 is a terminal device for a system manager to manage the storage subsystem(s) 4 in their entirety, and typically is configured by a general-purpose computer in which a management program is installed.

The system manager issues a command to the controller 42 via a user interface provided by the management device 5, thereby being able to acquire and refer to system configuration information of the storage subsystem(s) 4, and set and change the system configuration information. For example, through operation of the management device 5, the system manager is allowed to make settings of logical volumes and RAID (Redundant Array of Independent Disks) configuration in accordance with the increase/decrease of the hard disk drives. In this embodiment, the system manager can make settings of migration tasks and migration-destination requirements through operation of the management device 5.

Figures 2, 3:
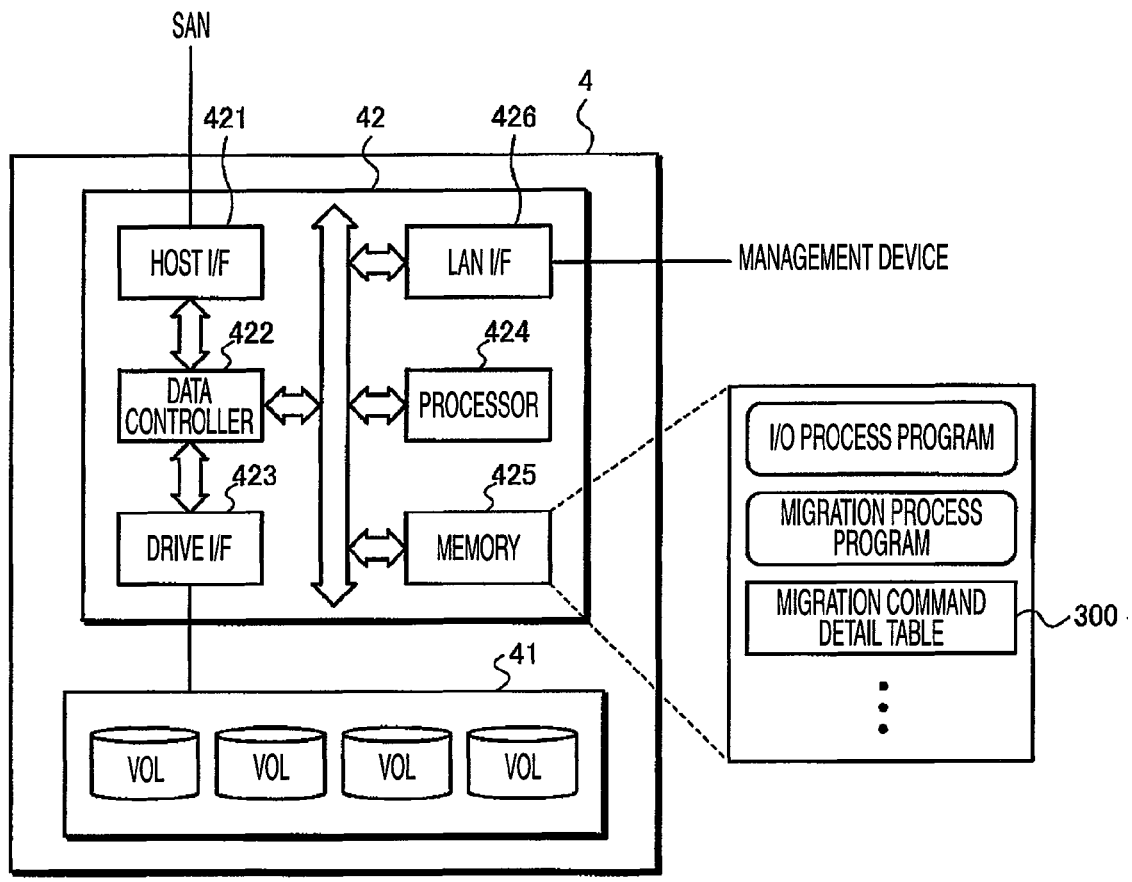
FIG. 2 is a block diagram for illustrating the configuration of a storage subsystem in the first embodiment of the invention.
FIG. 3 is a diagram showing an exemplary migration command detail table in the storage subsystem of the first embodiment of the invention.

FIG. 2 is a block diagram for illustrating the configuration of the storage subsystem 4 in the first embodiment of the invention.

As described above, the storage subsystem 4 is provided with the disk array 41 including a large-capacity storage medium such as hard disk drive for storage of data, and the controller 42 for controlling the disk array 41. The disk array 41 and the controller 42 are connected together via a disk channel. Although not shown, typically, the controller 42 is of duplex configuration.

The disk array 41 is configured by a plurality of hard disk drives, and one or more drive units, for example. The drive unit (s) each include a control circuit for drive control of each of the hard disk drives. The hard disk drives are each exemplified by FC (Fibre Channel) drive and SATA (Serial ATA) drive, and others. Such a hard disk drive is surely not restrictive, and alternatively, a solid state device (SSD) such as flash memory may be used.

The hard disk drives typically configure a RAID group based on a predetermined RAID level, and under the RAID control, an I/O (Input/Output) access is made thereto. The RAID control is performed by any known RAID controller or RAID engine (not shown) incorporated in the controller 42, for example. The hard disk drives belonging to the same RAID group are handled as a single logical device (virtual device). The virtual device is formed thereon with one or more logical units (LUs) or logical volumes (VOLs) (hereinafter, referred to as volumes) That is, the volumes are each a logical storage area configured by one or more hard disk drives each being a physical device.

The controller 42 is a system component being in charge of controlling over the storage subsystem(s) 4 in their entirety. The controller 42 mainly takes charge of I/O control with respect to any specific hard disk drive of the disk array 41 based on an I/O access request, i.e., I/O command, coming from the host computer(s) 3. In this embodiment, the controller 42 has a function of executing a data (volume) migration process under the control of the management device 5.

By referring to FIG. 2, the controller 42 is configured to include a host interface (host I/F) 421, a data controller 422, a drive interface (drive I/F) 423, a processor 424, a memory unit 425, and a LAN interface (LAN I/F) 426.

The host I/F 421 serves to establish a connection with the host computer(s) 3 over the network 2A, and performs control over data communications in accordance with a predetermined protocol with the host computer(s) 3. Upon reception of a writing request, i.e., writing command, from the host computer(s) 3, the host I/F 421 accordingly writes the writing command and data requested for writing to the memory unit 425 via the data controller 422.

The data controller 422 is an interface among the components in the controller 42, and is a chip set for controlling data exchange among the components. The data controller 422 includes a DMA (Direct Memory Access) controller that is not shown.

The drive I/F 423 is an interface for establishing a connection to the disk array 41, and under the control of the processor 424 based on the I/O command coming from the host computer(s) 3, performs control over data communications in accordance with a predetermined protocol with the disk array 41.

The processor 424 is responsible for the operation of the controller 42, i.e., storage subsystem 4, in its entirety by running various types of control programs loaded on the memory unit 425. For example, the processor 424 checks the memory unit 425 at regular intervals, and when finding any data on the memory unit 425 requested by the I/O command from the host computer(s) 3, controls the drive I/F 423, thereby accessing the disk array 41.

The memory unit 425 serves as a main memory of the processor 424, and also serves as a cache memory of the host I/F 421 and that of the drive I/F 423. The memory unit 425 is exemplified by a volatile memory such as DRAM (Dynamic Random Access Memory), or a nonvolatile memory such as flash memory. The memory unit 425 stores system configuration information of its own storage subsystem 4 together with various types of control programs. The system configuration information is essential for operation of the storage subsystem 4, and includes logical volume configuration information, RAID configuration information, and others. In FIG. 2 example, the memory unit 425 stores an I/O process program and a migration process program, and also stores a migration command detail table 300 as a part of the system configuration information. The migration process program is a control program for data migration from a volume to another. The migration process program performs control in such a manner that, for data migration, an I/O access from the host computer (s) 3 is directed to a volume being a migration destination.

The LAN I/F 426 is an interface circuit for connection with the management device 5 over the management network 2C.

The LAN I/F is exemplified by a network board conforming TCP/IP (Transmission Control Protocol/Internet Protocol) and Ethernet™.

FIG. 3 is a diagram showing an exemplary migration command detail table 300 in the storage subsystem 4 in the first embodiment of the invention.

As shown in FIG. 3, the migration command detail table 300 includes fields of a command detail ID 301, a migration-source device ID 302, a migration-source LUN (Logical Unit Number) 303, a migration-destination device ID 304, and a migration-destination LUN 305. The command detail ID 301 is an identifier for uniquely identifying the execution command coming from the management device 5 for a migration task. The migration-source device ID 302 is an identifier for uniquely identifying the storage subsystem 4 including a volume being a migration source, and the migration-source LUN 303 is an identifier for uniquely identifying the migration-source volume. That is, the migration-source volume is specified by a combination of the migration-source device ID 302 and the migration-source LUN 303. The migration-destination device ID 304 is an identifier for uniquely identifying the storage subsystem 4 including a volume being a migration destination, and the migration-destination LUN 305 is an identifier for uniquely identifying the migration-destination volume. That is, the migration-destination volume is specified by a combination of the migration-destination device ID 304 and the migration-destination LUN 305.

Figure 4:
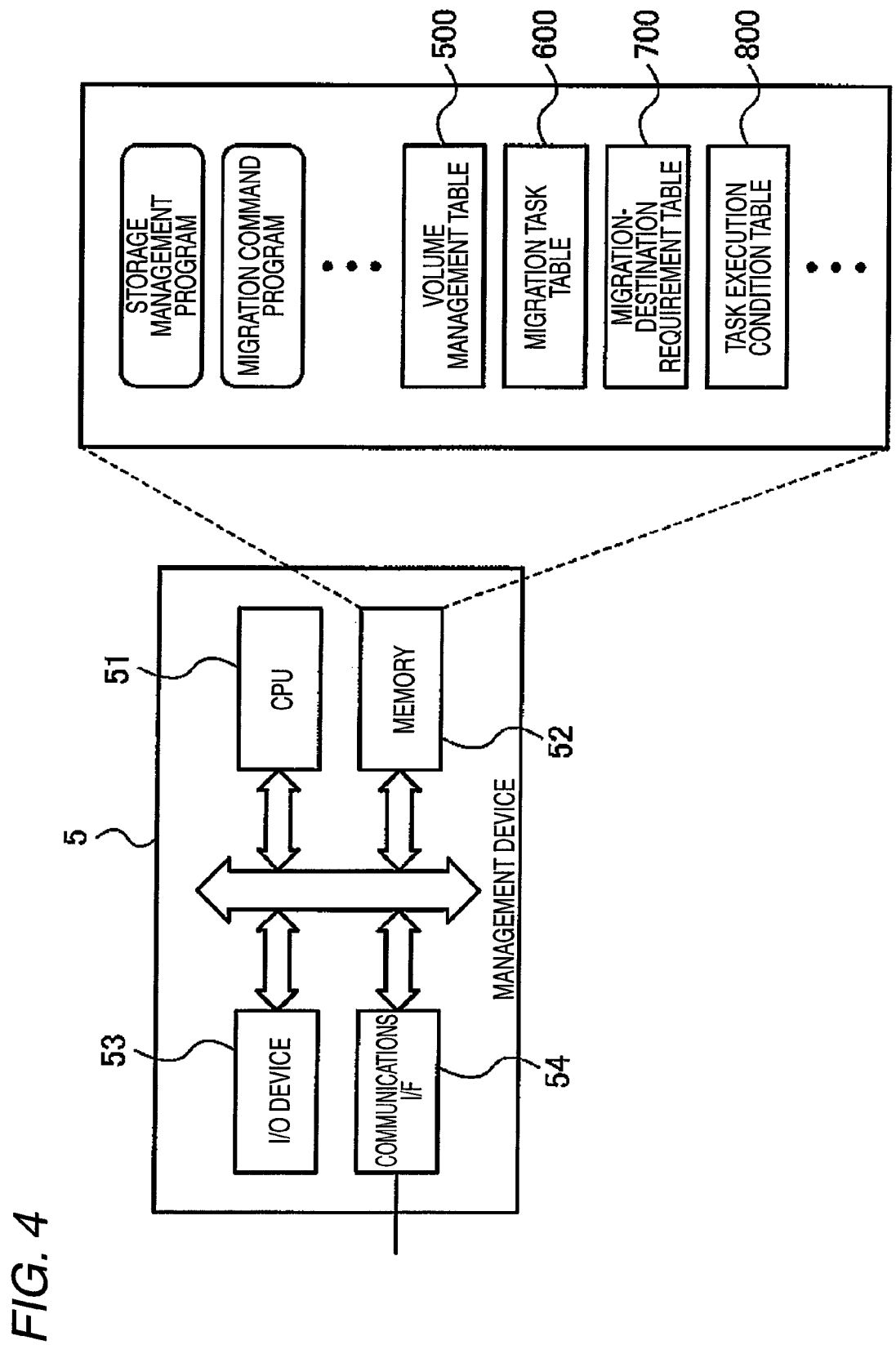
FIG. 4 is a block diagram for illustrating the configuration of a management device in the first embodiment of the invention.

FIG. 4 is a block diagram for illustrating the configuration of the management device 5 in the first embodiment of the invention.

As described in the foregoing, the management device 5 is a general-purpose computer, and thus is configured to include hardware resources such as a CPU (Central Processing Unit) 51, a memory 52, an I/O device 53, and a communications interface (communications I/F) 54, and software resources such as OS (Operating System) and a management program.

The CPU 51 runs various types of management programs stored in the memory 52, thereby providing a system manager with a system management tool. In FIG. 4 example, the memory 52 stores a storage management program and a migration command program, and also stores various types of tables, i.e., a volume management table 500, a migration task table 600, a migration-destination requirement table 700, and a task execution condition table 800. The storage management program is used for managing the storage subsystem(s) 4. The migration command program is used for issuing a command to the controller(s) 42 in the storage subsystem(s) 4 for data migration on volumes. In accordance with a migration command issued by the management device 5, the controller(s) 42 of the storage subsystem(s) 4 run the migration process program, thereby implementing the data migration process.

The I/O device 53 provides the system manager with the user interface environment, and is configured by a keyboard, a pointing device, a display, and others.

The communications I/F 54 serves as an interface for performing control over communications between any external devices, i.e., between the host computer(s) 3 and the storage subsystem(s) 4.

In FIG. 4, the management device 5 is provided outside of the storage subsystem(s) 4 over the management network 2C. This configuration is surely not the only option, and alternatively, the management device 5 may be disposed inside of the storage subsystem 4. Still alternatively, the controller 42 may be so configured as to include functions equivalent to those of the management device 5.

Figure 5:
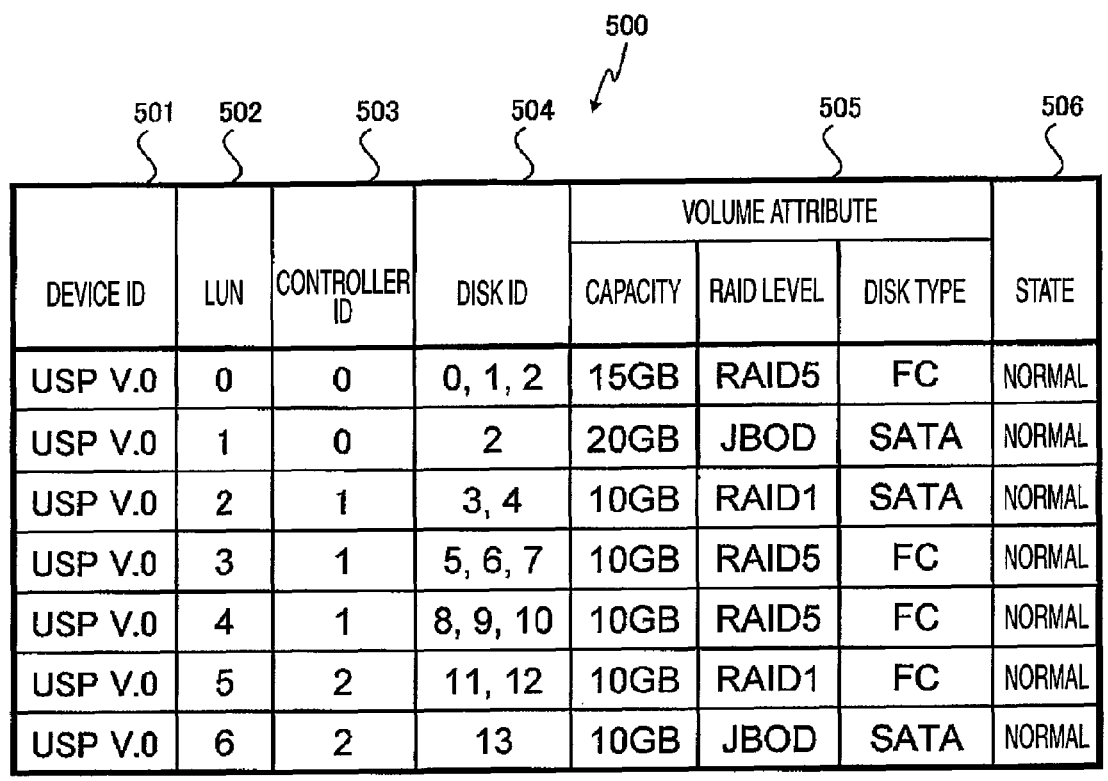
FIG. 5 is a diagram showing an exemplary volume management table in the management device of the first embodiment of the invention.

FIG. 5 shows an exemplary volume management table 500 in the management device 5 of the first embodiment of the invention. As shown in FIG. 5, the volume management table 500 includes fields of a device ID 501, a LUN 502, a controller ID 503, a disk ID 504, a volume attribute 505, and a state 506.

The device ID 501 is an identifier for uniquely identifying the storage subsystem 4 providing a volume. The LUN 502 is a logical unit number for uniquely identifying the volume in the storage subsystem 4. The controller ID 503 is an identifier for uniquely identifying the controller in charge of controlling the volume. The disk ID 504 is an identifier for identifying the hard disk drive(s) configuring the volume. Accordingly, when the volume is configured by a plurality of hard disk drives, the disk ID 504 shows a plurality of disk IDs for the volume. The volume attribute 505 shows the attribute of the volume. In FIG. 5 example, the attribute includes the capacity, the RAID level, and the disk type, but these are surely not restrictive. For example, the volume attribute 505 may include information about power saving control over the volume, and information about control over I/O accesses to the volume. The volume attribute 505 may also include the cost of the hard disk drive(s) configuring the volume, e.g., cost per bit, the cost of the storage subsystem 4 including the volume, and the I/O access performance of the volume. Moreover, the volume attribute 505 may include the security level of the volume, configuration group information for the volume, e.g., parity group, management group information for the volume, e.g., management right group, use group information for the volume, e.g., group of host computers 3 using the volume. The state 506 shows the operating state of the storage subsystem 4, i.e., "Normal" or "Abnormal".

FIG. 6 shows an exemplary migration task table 600 in the management device 5 of the first embodiment of the invention. As shown in FIG. 6, the migration task table 600 includes fields of a migration task ID 601, a migration-source device ID 602, a migration-source LUN 603, a migration-destination requirement ID 604, a migration-destination device ID 605, a migration-destination LUN 606, and a task execution date and time 607.

The migration task ID 601 is a number for uniquely identifying the migration task. The migration-source device ID 602 is an identifier for uniquely identifying the storage subsystem 4 including a migration-source volume. The migration-source LUN 603 is a logical unit number for uniquely identifying the migration-source volume. The migration-destination requirement ID 604 is an identifier for uniquely identifying the migration-destination requirement(s) defined for a migration-destination volume. The migration-destination requirements are those defined in the migration-destination requirement table 700. The migration-destination device ID 605 is an identifier for uniquely identifying the storage subsystem 4 including the migration-destination volume. The migration-destination LUN 606 is a logical unit number for uniquely identifying the migration-destination volume. The task execution date and time 607 indicates the date and time for executing the migration task.

Note that, as for the migration task of "3" in the migration task ID 601, because no migration-destination volume is yet determined therefor, the value in the migration-destination ID 605 and that in the migration-destination LUN 606 are both NULL. The process sequence for determining a migration-destination volume will be described later.

FIG. 7 is a diagram showing an exemplary migration-destination requirement table 700 in the management device 5 of the first embodiment of the invention. As shown in FIG. 7, the migration-destination requirement table 700 includes fields of a migration-destination requirement ID 701, a migration-destination requirement 702, an essential flag 703, and a migration completion date and time 704.

The migration-destination requirement ID 701 is an identifier for identifying the migration-destination requirement(s) set to every migration-destination volume, and is related to the migration-destination requirement ID 604 in the migration task table 600. The migration-destination requirement 702 indicates a requirement(s) that are supposed to be fulfilled by each of the migration-destination volumes, and is set in advance by a user, i.e., system manager. The essential flag 703 indicates whether the requirements in the migration-destination requirement 702 are each essential or arbitrary. The migration completion date and time 704 indicates the date and time until when the data migration has to be completed.

In this embodiment, the migration-destination requirement 702 is about the capacity of the volumes, about the RAID level of the volumes, and the disk type of the volumes. The migration-destination requirement 702 is surely not restrictive thereto, and may vary in type based on the property and characteristics of the volumes. In the embodiment, the requirements in the migration-destination requirement 702 may be assigned priority for use as an alternative to the essential flag 703.

FIG. 8 is a diagram showing an exemplary task execution condition table 800 in the management device 5 of the first embodiment of the invention. In the task execution condition table 800, conditions are defined for performing data migration again after data migration performed between the volumes. As shown in FIG. 8, the task execution condition table 800 includes fields of a condition ID 801, a migration task ID 802, an execution condition 803, and a task execution deadline 804.

The condition ID 801 is an identifier for uniquely identifying the condition for executing a migration task. The migration task ID 802 is an identifier for uniquely identifying the migration task. The execution condition 803 indicates the condition for executing the migration task. The execution condition 803 can be conditionally defined, e.g., failure recovery of any specific hard disk drive. The task execution deadline 804 indicates the expiration date for the migration task.

Figure 9:
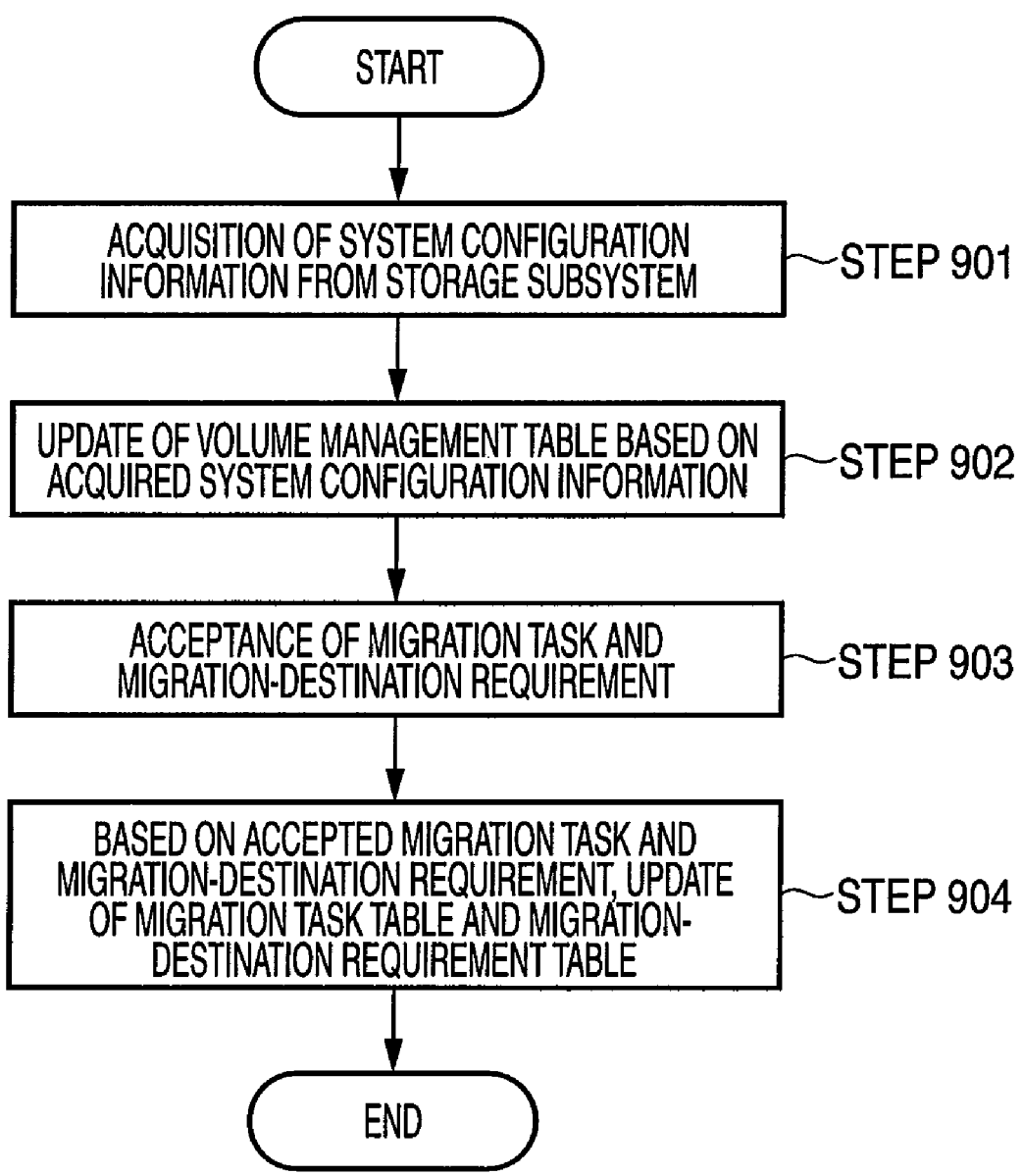
FIG. 9 is a diagram for illustrating a migration task setting process in the management device of the first embodiment of the invention.

FIG. 9 is a diagram for illustrating a migration task setting process to be executed by the management device 5 in the first embodiment of the invention. The migration task setting process is executed before a migration process for making settings of a migration task and a migration-destination requirement(s) therefor. The migration task setting process is implemented by the management device 5 running the storage management program.

In FIG. 9, through execution of the storage management program, the management device 5 acquires system configuration information of the storage subsystem 4 (STEP 901), and in accordance with thus acquired system configuration information, updates the volume management table 500 (STEP 902). The management device 5 then displays a migration task input screen to a system manager via the user interface for accepting any input of migration task. The management device 5 also displays a migration-destination requirement input screen for accepting any input of migration-destination requirement(s) (STEP 903). Based on thus provided inputs of migration task and migration-destination requirement (s), the management device 5 updates both the migration task table 600 and the migration-destination requirement table 700.

FIG. 10 shows an exemplary migration task input screen displayed on the user interface of the management device 5 in the first embodiment of the invention. As shown in FIG. 10, the system manager selects a migration-source device ID using a pull-down menu. The pull-down menu for the migration-source device ID includes a list of IDs of devices, i.e., storage subsystems 4, under the management of the storage management program. After the system manager selects any one specific storage subsystem 4 from the pull-down menu, a list of volumes in the storage subsystem 4 is displayed as a list of LUNs of the migration-destination volumes.

The system manager then selects any LUN of the migration-source volume using a radio button, for example. Similarly, the system manager selects any migration-destination device ID and any LUN of the migration-destination volume. The system manager also selects the date and time for execution of a task, i.e., year, month, and day, using a pull-down menu, and makes an input to a text box of "time" for execution of the task. When the system manager selects an "OK" button, the management device 5 accordingly accepts the input details, and reflects the input details into the migration task table 600.

Herein, FIG. 10 shows only an exemplary input method for the migration tasks, and this is surely not restrictive. The migration tasks may be input using a command line program, file/script program, and others.

FIG. 11 shows a migration-destination requirement input screen displayed on the user interface of the management device 5 in the first embodiment of the invention. As shown in FIG. 11, the system manager makes a selection, using a pull-down menu, from the "volume attribute" and the "condition" for use as the migration-destination requirements. The system manager also makes an input to a text box of "requirement". When the system manager wants to handle the input requirement as essential, he or she checks the check box of "Essential". When the system manager wants to make two or more inputs for the "requirement", he or she selects a button of "Addition of Requirement". When the button of "Addition of Requirement" is selected, the migration-destination requirement input screen newly displays pull-down menus for selection of volume attribute and condition, a text box for input of requirement(s), and a check box for input of Yes or No, i.e., whether the requirement (s) are essential or not. The system manager also selects "Year, Month, and Day" from the pull-down menu for the date and time for completion of the migration task, and makes an input to a text box of "time" for completion of the task migration. When the system manager selects an "OK" button, the management device 5 accordingly accepts the input details, and reflects the input details into the migration-destination requirement table.

Note that FIG. 11 shows only an exemplary input method for the migration-destination requirements, and this is surely not restrictive. Alternatively, the migration-destination requirements may be input using a command line program, a file/script program, and others. The management device 5 may accept any change made by the system manager to the migration-destination requirements at any arbitrary timing.

Figure 12:
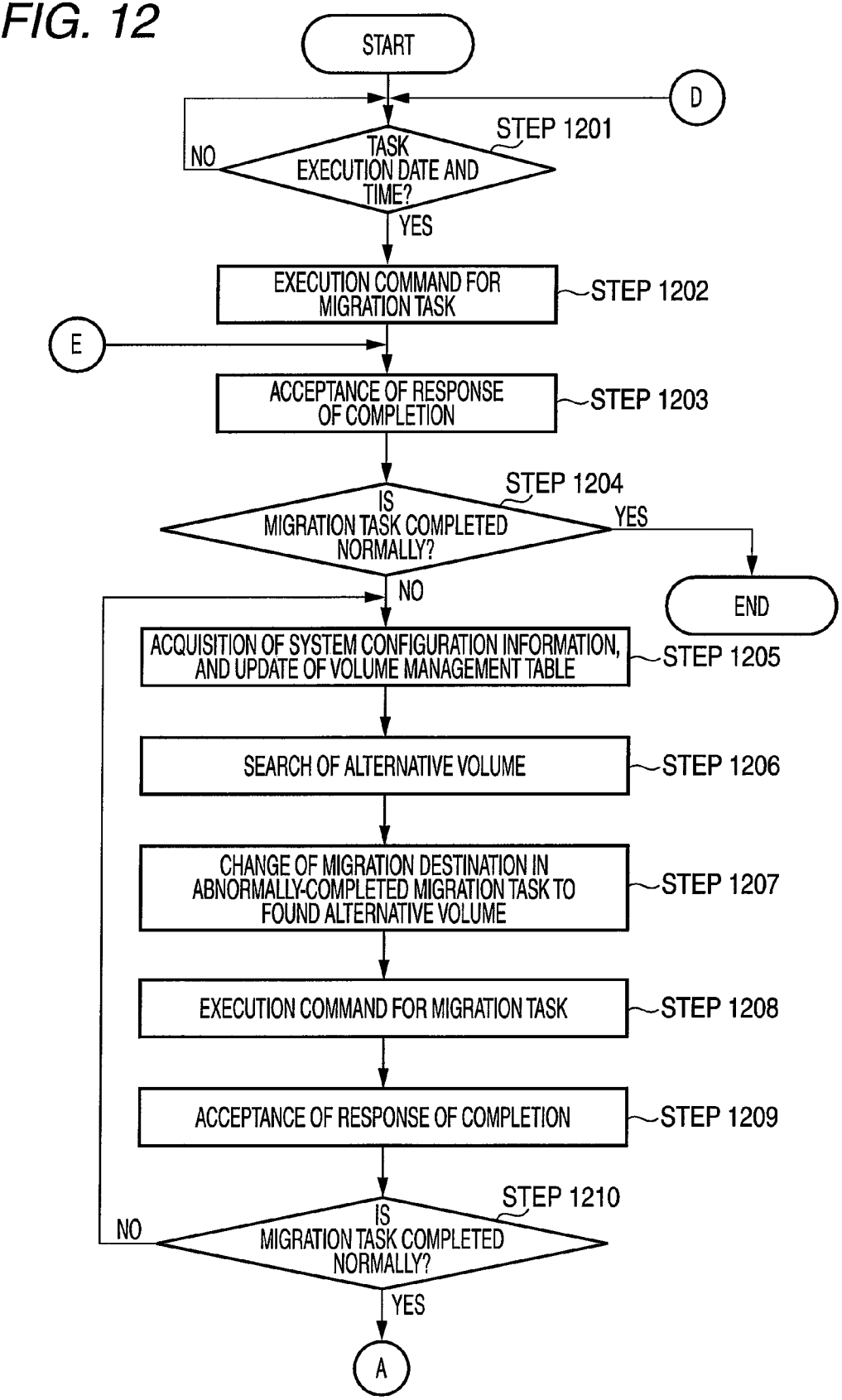
FIG. 12 is a diagram for illustrating a migration task management process to be executed by the management device in the first embodiment of the invention.
Figure 19:
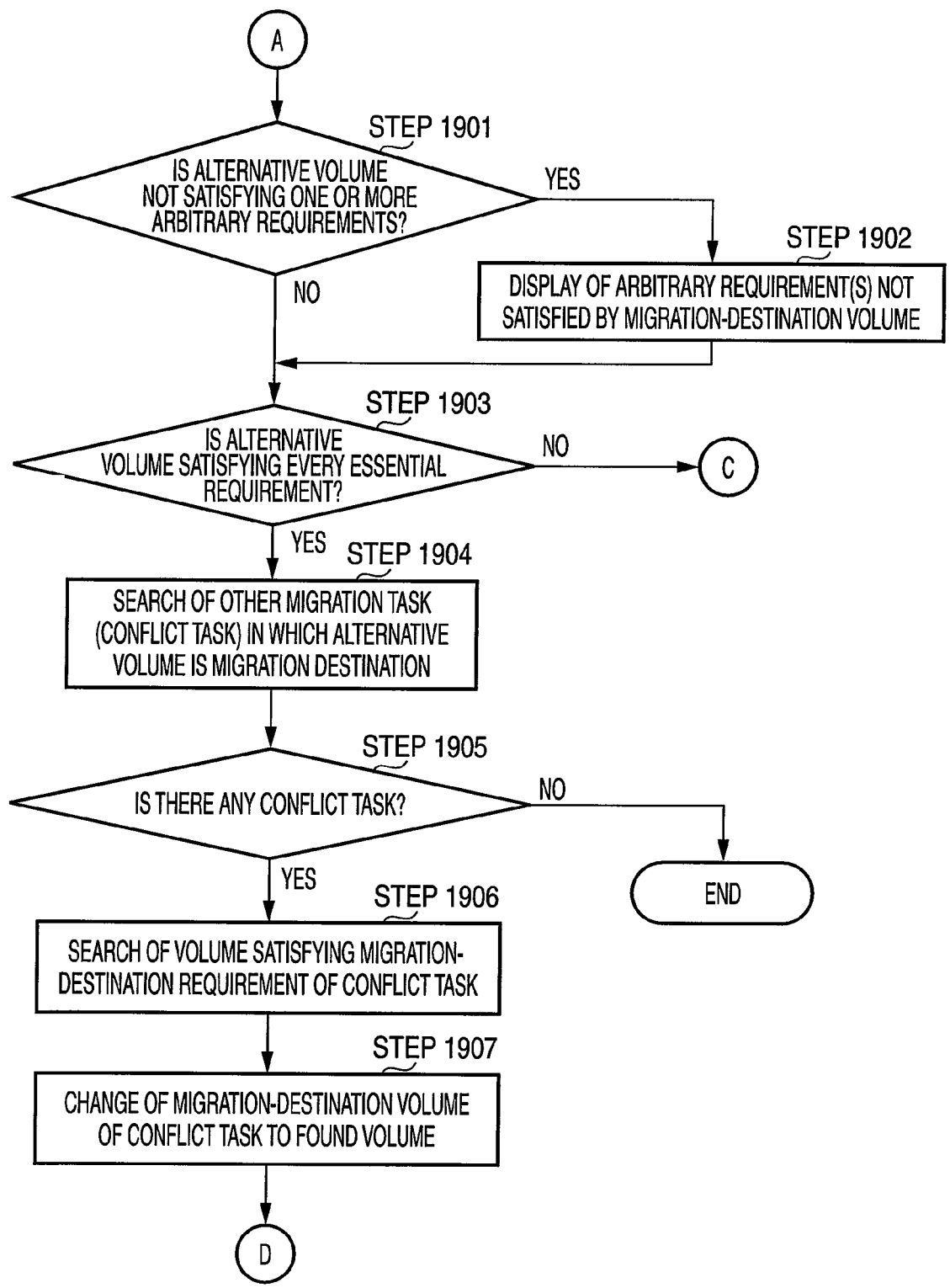
FIG. 19 is another diagram for illustrating the migration task management process to be executed by the management device in the first embodiment of the invention.
Figure 21:
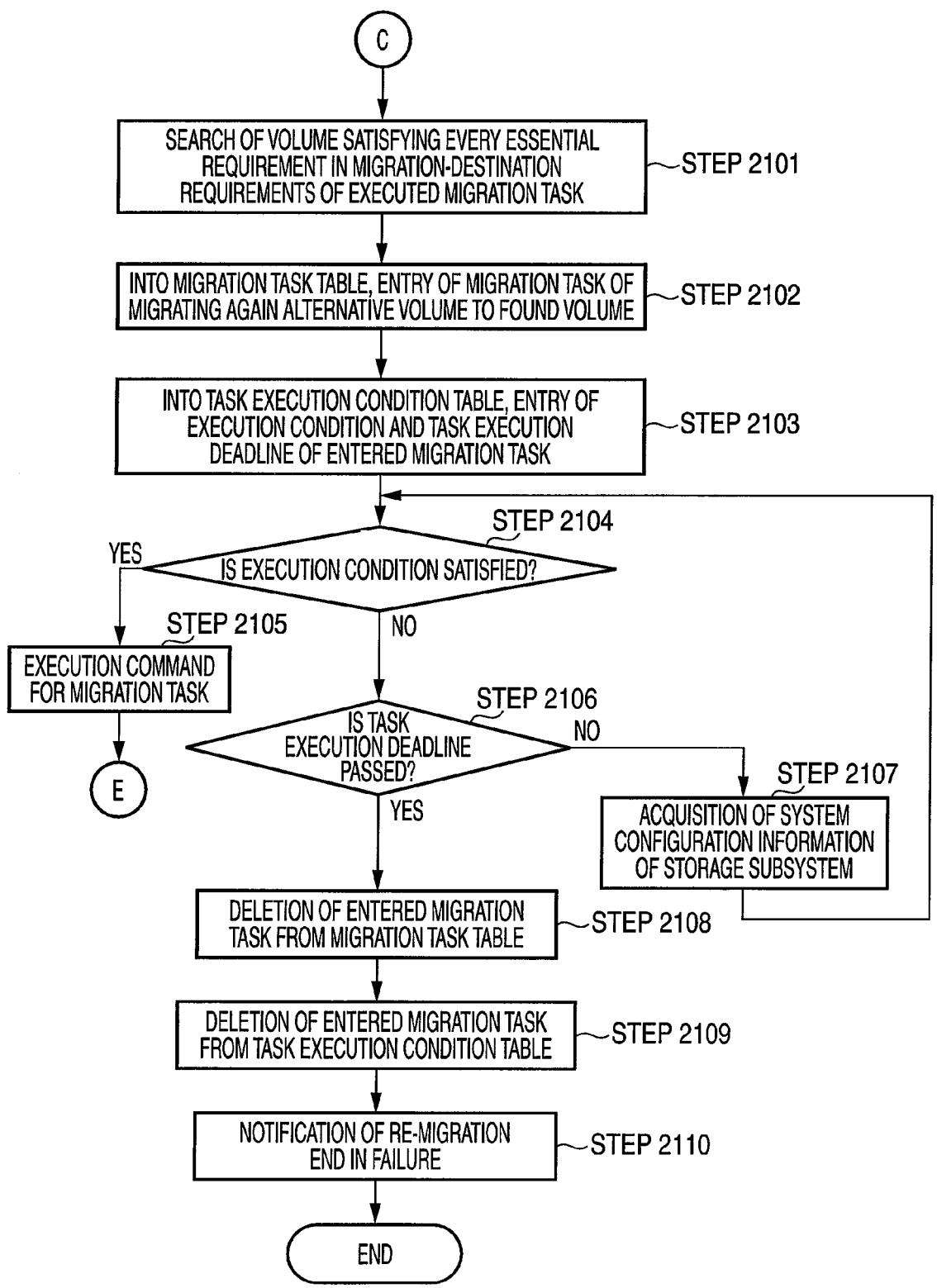
FIG. 21 is still another diagram for illustrating the migration task management process to be executed by the management device in the first embodiment of the invention.

FIGS. 12, 19, and 21 are each a diagram for illustrating a migration task management process to be executed by the management device 5 in the first embodiment of the invention. The migration task management process is implemented by the management device 5 running the migration command program.

As shown in the drawings, the management device 5 refers to the migration task table 600 to search and specify any migration task whose task execution date and time is already passed (STEP 1201). When there is any applicable migration task (Yes in STEP 1201), the management device 5 issues a command to the storage subsystem 4 to execute the migration task, i.e., migration process (STEP 1202). To be specific, the management device 5 issues a command, for data migration, to the storage subsystem 4 identified by the migration-source device ID 602 of the entry in the migration task table 600, i.e., for migrating data on the volume identified by the migration-source LUN 603 to the volume identified by the migration-destination LUN 606 in the storage subsystem 4 identified by the migration-destination device ID 605.

Figure 13:
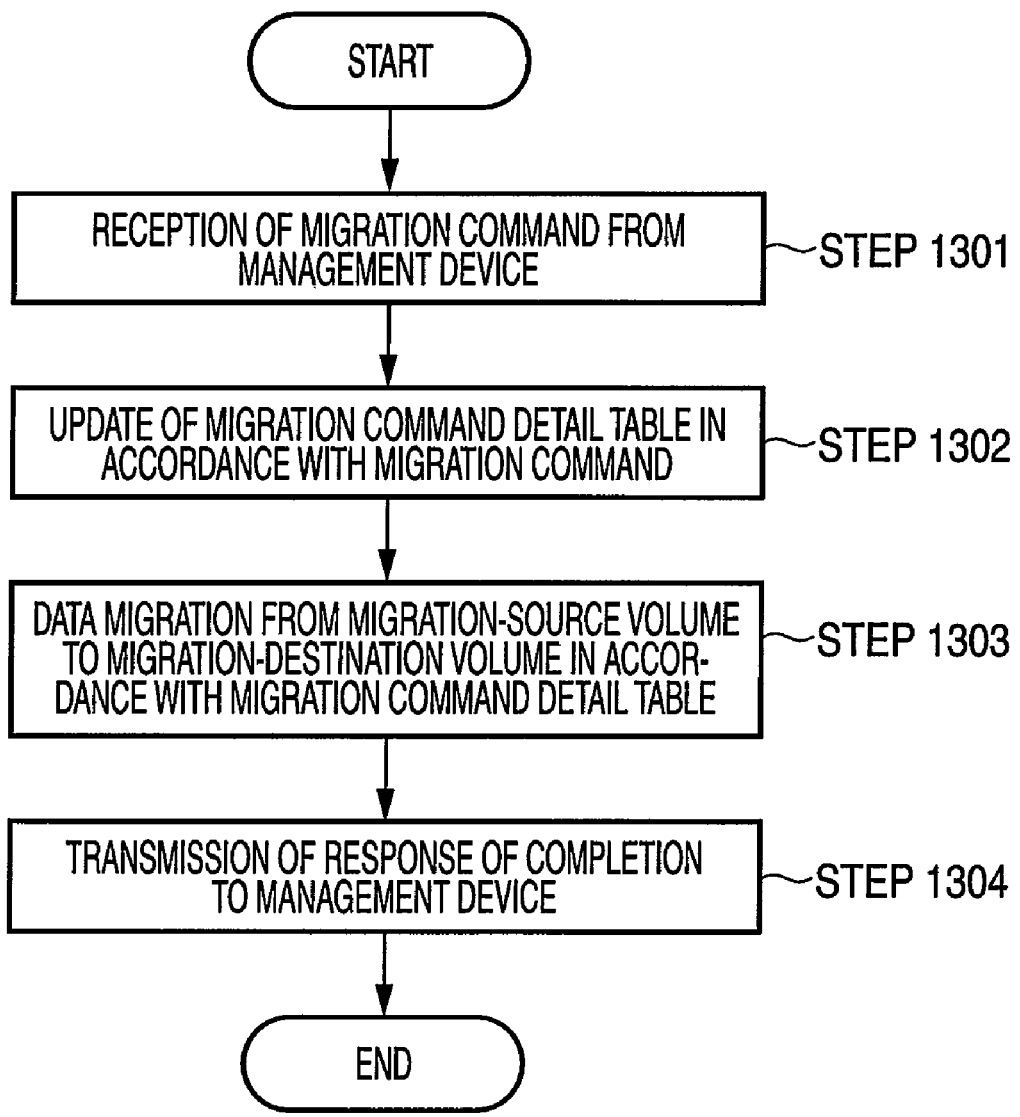
FIG. 13 is a flowchart of a migration process to be executed by a controller in the storage subsystem of the first embodiment of the invention.

FIG. 13 is a flowchart of the migration process to be executed by the controller 42 of the storage subsystem 4 in the first embodiment of the invention. The migration process is implemented by the controller 42 running the migration process program.

Upon reception of a migration command from the management device 5 (STEP 1301), the controller 42 updates the migration command detail table 300 in accordance with the migration command (STEP 1302). The storage subsystem 4 provided with such a migration command executes the migration process of data by following the migration command detail table 300 (STEP 1303).

That is, the controller 42 refers to the migration command detail table 300, and migrates data on the volume identified by both the migration-source device ID 302 and the migration-source LUN 303 to the volume identified by both the migration-destination device ID 304 and the migration-destination LUN 305. For data migration as such, a copy function may be used. Moreover, when such data migration is in progress, even if data writing is performed from the host computer 3 to the migration-source volume, this causes no problem as long as the data is migrated to the migration-destination volume by mirroring, for example, at the time of completion of data migration.

After completion of data migration, the controller 42 updates the access control information about the volume so as to direct the host computer 3 to access the migration-destination volume. The controller 42 then notifies the management device 5 of the result of the migration task, i.e., a response of completion (STEP 1304). The result of the migration task includes a status whether the migration process is completed normally or abnormally.

Referring back to FIG. 12, after receiving the response of completion from the controller 42 of the storage subsystem 4 (STEP 1203), based on the response of completion, the management device 5 determines whether the migration task is completed normally or not (STEP 1204). When determining that the migration task is completed normally (Yes in STEP 1204), the management device 5 ends the migration task management process. On the other hand, when determining that the migration task is completed abnormally (No in STEP 1204), the management device 5 acquires the system configuration information about the storage subsystem 4 for finding an alternative volume, and in accordance with thus acquired system configuration information, updates the volume management table 500 (STEP 1205). Herein, the cause of the abnormal termination of the migration task exemplarily includes component failure in the storage subsystem 4. Assuming in this example is that a failure occurred to any one of the hard disk drives in the disk array 41, e.g., physical disk under the disk ID 504 of 5 in the volume management table 500. In this case, the hard disk drive under the disk ID 504 of 5 in the volume management table 500 is acknowledged as being broken, and the state 506 is changed to "Abnormal" for the volume under the device ID 501 of USP V.0, and the LUN 502 of 3.

The management device 5 then refers to various tables, i.e., the volume management table 500, the migration task table 600, and the migration-destination requirement table 700, and searches and specifies any other volume satisfying the largest number of the migration-destination requirements set to the abnormally-terminated migration task (STEP 1206). In this example, from the volumes showing "Normal" in the state 506 in the volume management table 500, selected as an alternative volume is the one satisfying the largest number of the essential requirements. When such a volume satisfying the largest number of the essential requirements is found plurally, selected therefrom is the volume satisfying the largest number of the arbitrary requirements.

The management device 5 refers to the volume management table 500 and the migration task table 600, and changes the values of the abnormally-terminated migration task in the migration-destination device ID 605 and the migration-destination LUN 606 to the values of the specified volume in the device ID 501 and the LUN 502 (STEP 1207).

Thereafter, the management device 5 refers to the migration task table 600, and issues a command to the storage subsystem 4 for execution of the migration task through with value changes as such (STEP 1208). In response thereto, as described above, the controller 42 of the storage subsystem 4 executes the migration process, and forwards a response of completion back to the management device 5.

The management device 5 then accepts the response of completion from the controller 42 (STEP 1209), and determines whether or not the migration task is completed normally (STEP 1210). When the management device 5 determines that the migration task ends in failure (No in STEP 1210), the procedure returns to the process in STEP 1205. On the other hand, when the management device 5 determines that the migration task for the alternative volume is completed normally (Yes in STEP 1210), the procedure goes to a follow-up process of FIG. 19 after the data migration.

Figure 14:
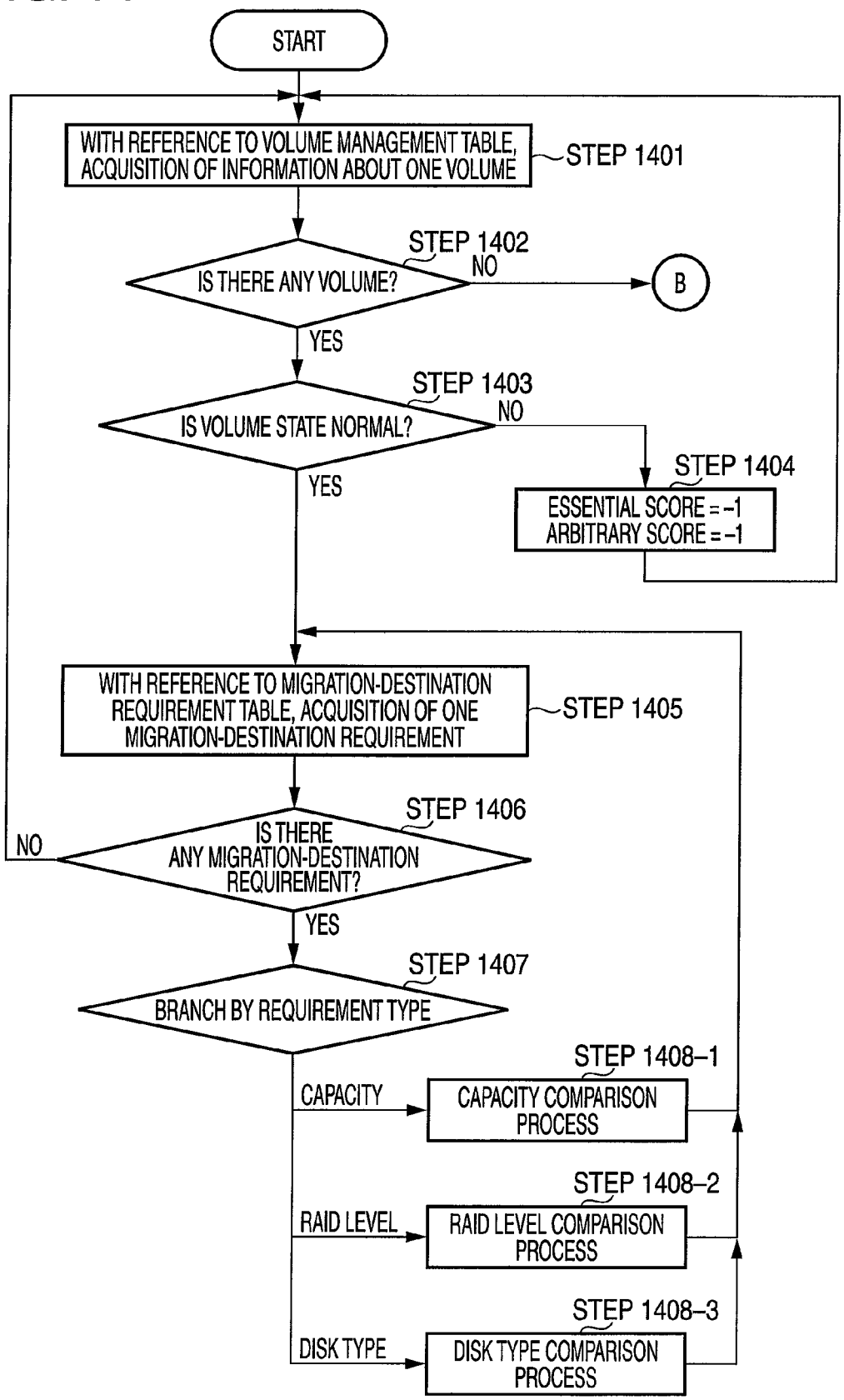
FIG. 14 is a flowchart of a volume search process to be executed by the management device in the first embodiment of the invention.
Figure 15:
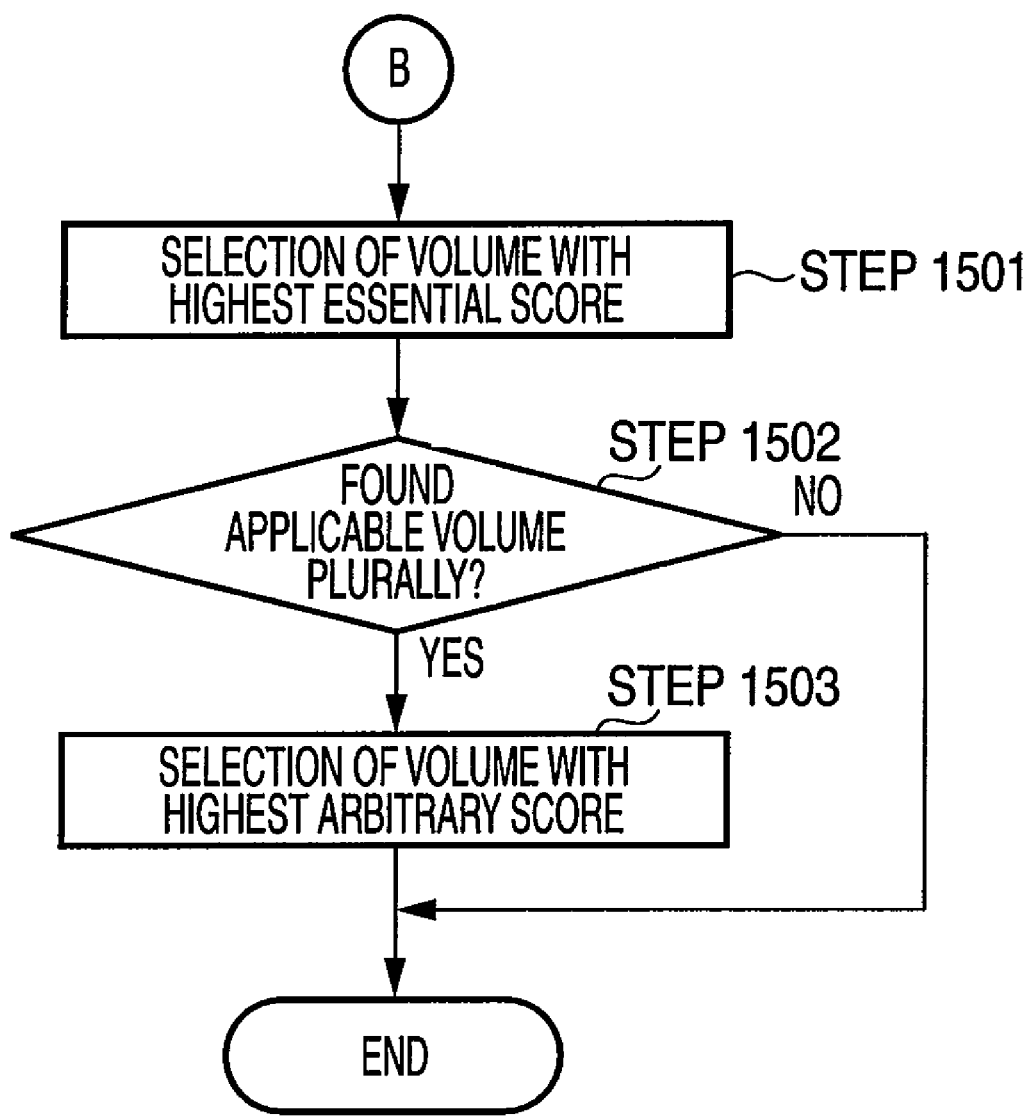
FIG. 15 is another flowchart of the volume search process to be executed by the management device in the first embodiment of the invention.

FIGS. 14 and 15 are each a flowchart of a volume search process to be executed by the management device 5 in the first embodiment of the invention, i.e., detailed flowchart of the process in STEP 1206 of FIG. 12.

As shown in these drawings, the management device 5 refers to the volume management table 500, and selects any one specific volume not yet searched, and acquires information about thus selected volume (STEP 1401). When the management device 5 determines that there is no volume for selection (No in STEP 1402), the procedure goes to the process in STEP 1501 of FIG. 15.

The management device 5 determines whether the selected volume shows "Normal" in the state 506 (STEP 1403). When determining that the selected volume is not showing "Normal" in the state 506 (No in STEP 1403), the management device 5 sets "−1" to both essential and arbitrary scores (STEP 1404), and the procedure returns to the process in STEP 1401. Herein, the essential score denotes a value for the volume indicating the degree of satisfying the essential requirements in the migration-destination requirements. The arbitrary score denotes a value for the volume indicating the degree of satisfying the arbitrary requirements therein. In this example, a larger value means a higher degree of satisfying the requirements.

On the other hand, when determining that the selected volume shows "Normal" in the state 506 (Yes in STEP 1403), the management device 5 refers to the migration-destination requirement table 700, and selects any one specific requirement from the migration-destination requirement 702 (STEP 1405). For example, the requirement selected in the migration-destination requirement 702 is "capacity≧10 GB". As such, when the migration-destination requirement 702 shows a plurality of requirements for the volume as the "requirement 1" in the migration-destination requirement ID 701, the requirements found for the volume in the migration-destination requirement 702 are sequentially selected.

When the management device 5 determines that there is no requirement for the volume in the migration-destination requirement 702 for selection (No in STEP 1406), the procedure returns to the process in STEP 1401.

When determining that there is any requirement for the volume in the migration-destination requirement 702 for selection (Yes in STEP 1406), the management device 5 makes a branch determination based on the type of the requirement found in the migration-destination requirement 702 (STEP 1407) That is, when the requirement found in the migration-destination requirement 702 for the volume is related to the "capacity", the management device 5 executes a capacity comparison process (STEP 1408-1). When the requirement therein for the volume is related to the "RAID level", the management device 5 performs a RAID level comparison process (STEP 1408-2). Moreover, when the requirement therein for the volume is related to the "disk type", the management device 5 performs a disk type comparison process (STEP 1408-3). In these processes, the management device 5 calculates essential and arbitrary scores for every volume. These processes are described by referring to FIGS. 16 to 18. After any of such processes, the procedure returns to the process in STEP 1405 for the management device 5 to select any other requirement from the migration-destination requirement 702 for the next use.

When there is no more volume for selection (No in STEP 1402), the management device 5 selects a volume showing the highest calculation value of the essential score (STEP 1501 of FIG. 15). The management device 5 then determines whether such a volume is found plurally or not (STEP 1502). When determining that such a volume is found plurally (Yes in STEP 1502), the management device 5 selects a volume showing the highest calculation value of the arbitrary score (STEP 1503). Herein, when such a volume showing the highest value of the arbitrary score is found plurally, a volume selection is made in order of entry in the volume management table.

Note that, in this example, a volume search is optimally made based on the essential and arbitrary scores, but this is surely not restrictive.

Figure 16:
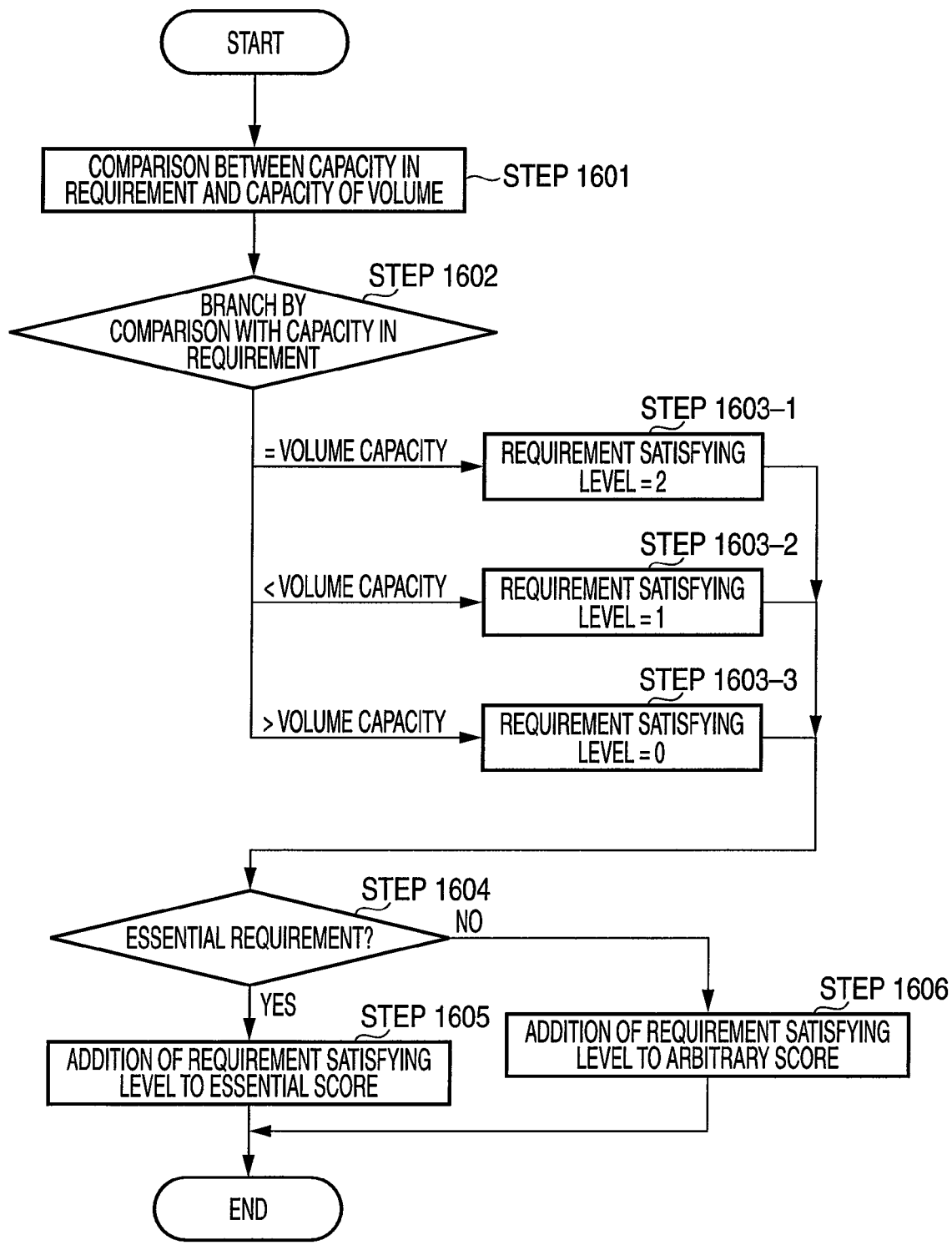
FIG. 16 is a flowchart of a capacity comparison process in STEP 1408-1 of FIG. 14.

FIG. 16 is a flowchart of the capacity comparison process in STEP 1408-1 of FIG. 14.

As shown in FIG. 16, first of all, the management device 5 makes a comparison in terms of capacity, i.e., compares the capacity of the volume selected from the volume management table 600 (refer to STEP 1401 of FIG. 14), and the capacity of the migration-destination requirement selected from the migration-destination requirement table 700 (refer to STEP 1405) (STEP 1601). The management device 5 then makes a branch determination based on the comparison result (STEP 1602).

That is, when the capacity in the migration-destination requirement 702 is equal to the capacity of the selected volume, the management device 5 sets "2" to the requirement satisfaction level (STEP 1603-1). When the capacity of the selected volume is larger than the capacity in the migration-destination requirement 702, the management device 5 sets "1" to the requirement satisfying level (STEP 1603-2). Moreover, when the capacity of the selected volume is smaller than the capacity in the migration-destination requirement 702, the management device 5 sets "0" to the requirement satisfying level (STEP 1603-3). The requirement satisfying level here denotes a value indicating how much the selected volume satisfying the migration-destination requirement, and is an integer from 0 to 2 in this example.

Next, the management device 5 refers to the essential flag 703 in the migration-destination requirement table 700 for the corresponding entry, and determines whether the selected migration-destination requirement is essential or not (STEP 1604). When determining that the selected migration-destination requirement is essential (Yes in STEP 1604), the management device 5 adds the corresponding value of the requirement satisfying level to the essential score (STEP 1605). On the other hand, when determining that the selected migration-destination requirement is not essential, i.e., is arbitrary (No in STEP 1604), the management device 5 adds the corresponding value of the requirement satisfying level to the arbitrary score (STEP 1606).

Figure 17:
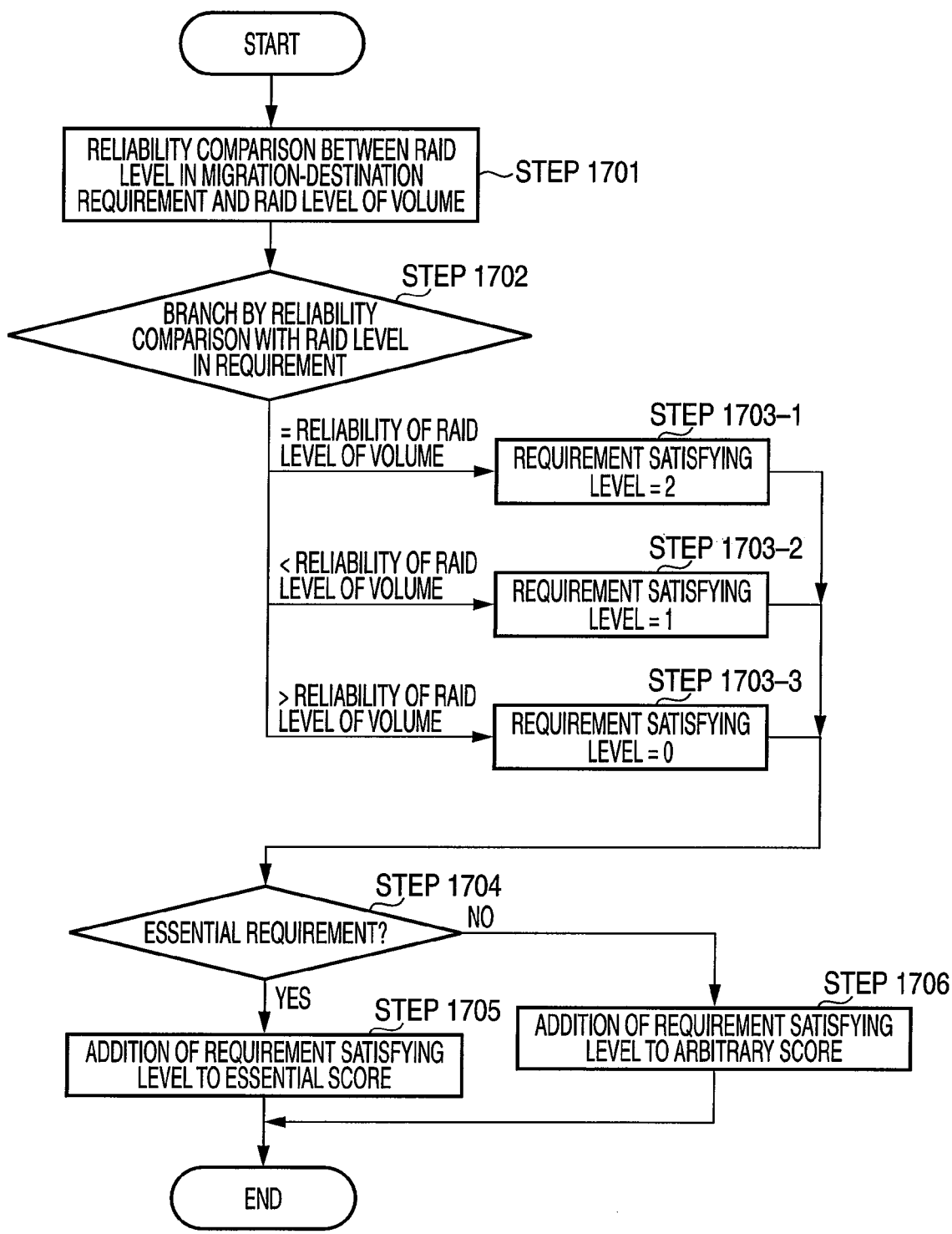
FIG. 17 is a flowchart of a RAID level comparison process in STEP 1408-2 of FIG. 14.

FIG. 17 is a flowchart of the RAID level comparison process in STEP 1408-2 of FIG. 14.

As shown in FIG. 17, first of all, the management device 5 makes a comparison in terms of RAID level, i.e., compares the RAID level of the volume selected from the volume management table 600 (refer to STEP 1401 of FIG. 14), and the RAID level of the requirement selected from the migration-destination requirement 702 in the migration-destination requirement table 700 (refer to STEP 1405). The management device 5 then makes a determination about reliability superiority or inferiority in terms of RAID level (STEP 1701). The management device 5 then makes a branch determination based on the comparison result (STEP 1702). The reliability of the RAID level is defined whether data can be recovered or not with how many broken hard disk drives. Generally, the RAID level with the mirroring configuration and parity is considered high in reliability. In this embodiment, the reliability of the RAID level is defined as below.

RAID1>RAID0+1=RAID1+
0>RAID6>RAID5>RAID2=RAID3=RAID4>RAID0=JBOD
(Just a Bunch Of Disks)

As a result of the branch determination, when the RAID level in the migration-destination requirement 702 is the same as that of the selected volume, the management device 5 sets "2" to the requirement satisfying level (STEP 1703-1). When the RAID level of the selected volume is higher than that in the migration-destination requirement 702, the management device 5 sets "1" to the requirement satisfying level (STEP 1703-2). Moreover, when the RAID level of the selected volume is lower than that in the migration-destination requirement 702, the management device 5 sets "0" to the requirement satisfying level (STEP 1703-3).

Next, the management device 5 refers to the essential flag 703 of the corresponding entry in the migration-destination requirement table 700, and determines whether the requirement selected in the migration-destination requirement 702 is essential or not (STEP 1704). When determining that the requirement selected therein is essential (Yes in STEP 1704), the management device 5 adds the corresponding value of the requirement satisfying level to the essential score (STEP 1705). On the other hand, when determining that the requirement selected therein is not essential, i.e., is arbitrary (No in STEP 1704), the management device 5 adds the corresponding value of the requirement satisfying level to the arbitrary score (STEP 1706).

Figure 18:
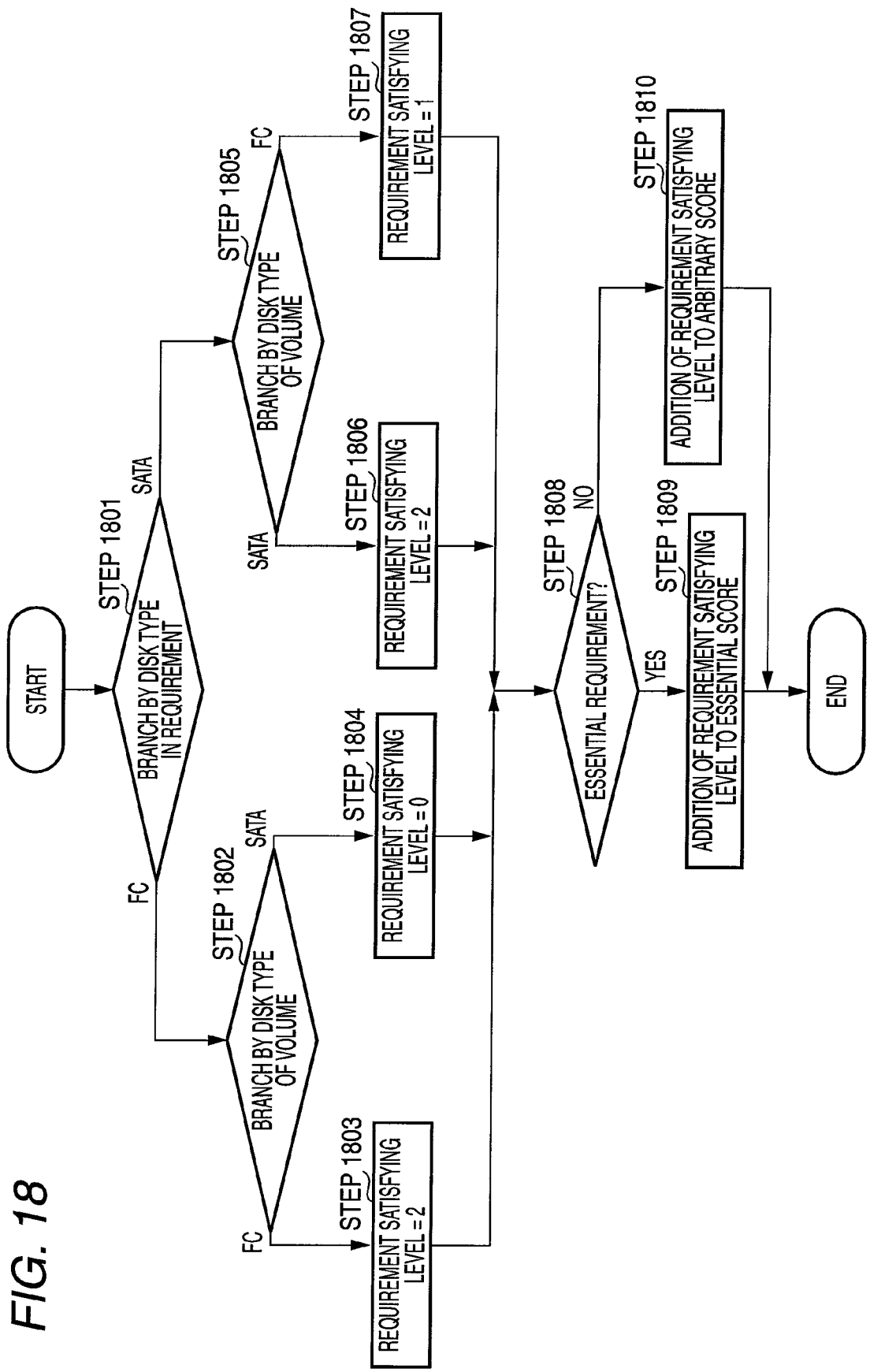
FIG. 18 is a flowchart of a disk type comparison process in STEP 1408-3 of FIG. 14.

FIG. 18 is a flowchart of the disk type comparison process in STEP 1408-3 of FIG. 14.

As shown in FIG. 18, first of all, the management device 5 determines the disk type of the migration-destination requirement selected in the migration-destination requirement table 700 (refer to STEP 1405) (STEP 1801). That is, when determining that the disk type of the requirement selected in the migration-destination requirement 702 is "FC", the management device 5 then determines the disk type of the volume selected in the volume management table 500 (refer to STEP 1401 of FIG. 14) (STEP 1802). When determining that the disk type of the selected volume is "FC", the management device 5 sets "2" to the requirement satisfying level (STEP 1803). On the other hand, when determining that the disk type of the selected volume is "SATA", the management device 5 sets "0" to the requirement satisfying level (STEP 1804).

On the other hand, when determining that the disk type of the requirement selected in the migration-destination requirement 702 is "SATA", the management device 5 then determines the disk type of the volume selected in the volume management table 500 (STEP 1805). When determining that the disk type of the selected volume is "SATA", the management device 5 sets "2" to the requirement satisfying level (STEP 1806). On the other hand, when determining that the disk type of the selected volume is "FC", the management device 5 sets "1" to the requirement satisfying level (STEP 1807).

Next, the management device 5 refers to the essential flag 703 of the corresponding entry in the migration-destination requirement table 700, and determines whether the selected migration-destination requirement is essential or not (STEP 1808). When determining that the selected migration-destination requirement is essential (Yes in STEP 1808), the management device 5 adds the corresponding value of the requirement satisfying level to the essential score (STEP 1809). On the other hand, when determining that the selected migration-destination requirement is not essential, i.e., is arbitrary (No in STEP 1808), the management device 5 adds the corresponding value of the requirement satisfying level to the arbitrary score (STEP 1810).

FIG. 19 is a flowchart of the migration task management process to be executed by the management device 5 in the first embodiment of the invention, specifically, the follow-up process after the migration process. In the follow-up process, when any other volume is newly selected as a migration destination, a check is made whether or not any conflict is observed with the migration-destination volumes in the existing migration tasks.

Figure 20:
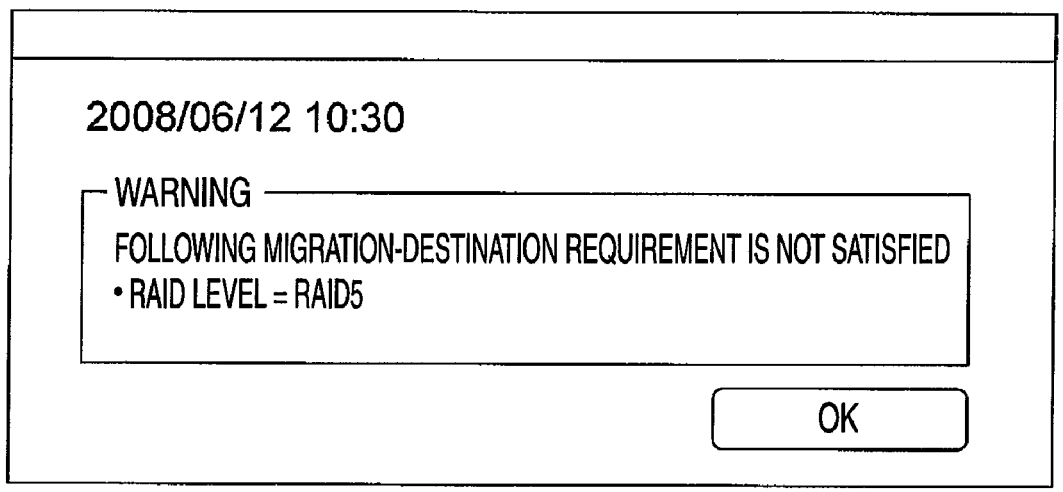
FIG. 20 is a diagram showing an exemplary warning screen displayed on the user interface in the management device of the first embodiment of the invention.

That is, the management device 5 determines whether the volume newly selected as a migration destination, i.e., alternative volume, is not satisfying one or more of the arbitrary requirements in the migration-destination requirement table 700 (STEP 1901). When determining that the alternative volume is not satisfying one or more of the arbitrary requirements in the migration-destination requirement table 700 (Yes in STEP 1901), as shown in FIG. 20, the management device 5 displays, to the system manager, a warning screen including a list of the arbitrary requirements not satisfied by the alternative volume (STEP 1902). In this example, displayed in the warning screen to the system manager are the arbitrary requirements not satisfied by the alternative volume, but this is surely not the only possibility. For example, the management device 5 may output the arbitrary requirements not satisfied by the alternative volume to a log file, and the system manager may refer to the log file.

The management device 5 then determines whether or not the alternative volume satisfies all of the essential requirements in the migration-destination requirement table 700 (STEP 1903). When the management device 5 determines that the alternative volume is not satisfying all of the essential requirements (No in STEP 1903), the procedure goes to the process of FIG. 21.

When determining that the alternative volume satisfies all of the essential requirements (Yes in STEP 1903), the management device 5 refers to the migration task table 600, and searches and specifies any other migration task in which the alternative volume is a migration destination (hereinafter, the resulting task is referred to as "conflict task") (STEP 1904). That is, in response to the change of the migration-destination volume, a search is made whether there is any migration task in which any conflict is observed with thus changed migration-destination volume. When the management device 5 determines that there is no such conflict task (No in STEP 1905), this is the end of the data migration process.

When determining that there is such a conflict task (Yes in STEP 1905), the management device 5 refers to the migration-destination requirement table 700, and searches and specifies any volume satisfying the migration-destination requirement(s) of the conflict task (STEP 1906). The management device 5 also refers to the volume management table 500 and the migration task table 600, and changes the migration destination for the volume(s) in the conflict task to the specified volume (STEP 1907).

FIG. 21 is a flowchart of the migration task management process to be executed by the management device 5 in the first embodiment of the invention, specifically, a re-migration process for any conflict task.

That is, the management device 5 refers to the volume management table 600, and from the migration-destination requirements for the migration task asked for execution in STEP 1202, searches and specifies any volume satisfying all of the essential requirements (STEP 2101). Thereafter, the management device 5 enters, into the migration task table, a migration task of migrating again the volume used as a migration destination in STEP 1208, i.e., alternative volume, to the specified volume (STEP 2102). Such a migration task is referred to as re-migration task. The management device 5 also enters, into the task execution condition table, the execution condition and the task execution deadline of the migration task entered in the table as such (STEP 2103). For example, the management device 5 sets the execution condition as resolving the cause of the change of the migration-destination volume, and sets a predetermined length of time to the task execution deadline, e.g., three days after. Alternatively, the management device 5 may accept any input of execution condition and task execution deadline via the user interface. In this example, the execution condition for the task is the failure recovery of any one specific hard disk drive in the storage subsystem 4.

Next, the management device 5 refers to the task execution condition table 800, and determines whether or not the task execution conditions are satisfied (STEP 2104). When determining that the task execution conditions are satisfied (Yes in STEP 2104), the management device 5 issues a command to the storage subsystem 4 for execution of the newly-entered migration task (STEP 2105). In response thereto, the controller 42 of the storage subsystem 4 executes the data migration process, and forwards the execution result, i.e., response of completion, back to the management device 5. Upon reception of the response of completion (STEP 1203 of FIG. 12), the management device 5 determines whether the migration task is completed normally or not (STEP 1204).

On the other hand, when determining that the task execution conditions are not satisfied (No in STEP 2104), the management device 5 determines whether the task execution deadline of the migration task has been passed or not (STEP 2106). When determining that the task execution deadline is not yet passed (No in STEP 2106), the management device 5 acquires the latest system configuration information from the storage subsystem 4, and updates the volume management table (STEP 2107), thereby determining whether the task execution conditions are satisfied or not (STEP 2104). As an example, when the physical disk (hard disk drive under the disk ID 504 of 5) in the storage subsystem 4 is recovered from a failure, the state 506 for the volume configured by the hard disk drive is changed to "Normal" so that the task execution conditions are satisfied.

Figure 22:
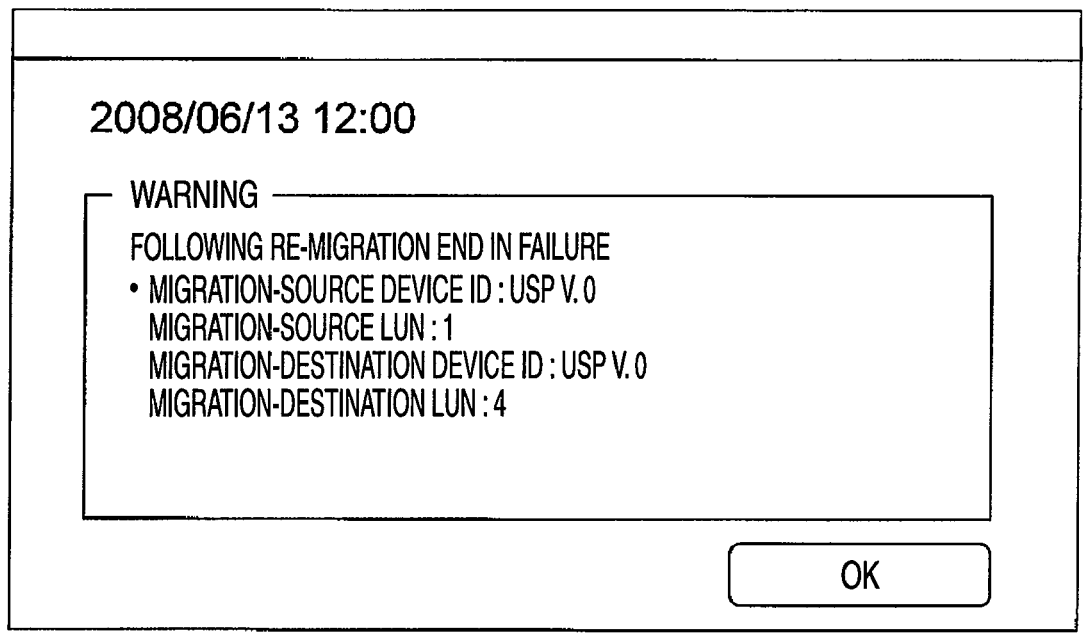
FIG. 22 is a diagram showing another exemplary warning screen displayed on the user interface in the management device of the first embodiment of the invention.

When determining that the task execution deadline has been passed (Yes in STEP 2106), the management device 5 deletes the newly-entered migration task from the migration task table (STEP 2108), and deletes the migration task also from the task execution condition table (STEP 2109). As shown in FIG. 22, the management device 5 then displays a warning screen to the system manager to notify that the re-migration ends in failure (STEP 2110). In this example, the system manager is informed by the warning screen that the re-migration ends in failure, but this is surely not restrictive. Alternatively, the management device 5 may output the notification that the re-migration ends in failure to a log file, and the system manager may refer to the log file.

As described in the foregoing, during data migration, even if a migration-destination volume is not available for use for some reason, any other volume satisfying migration-destination requirements arbitrarily defined by a user (system manager) as an alternative migration-destination volume. Moreover, when the alternative volume is satisfying all of the essential requirements in the migration-destination requirements, even if no perfect matching is derived with the migration-destination requirement for the original volume, re-migration is not taken place. On the other hand, when the alternative volume is not satisfying at least one essential requirement in the migration-destination requirements, re-migration is taken place to make the alternative volume to satisfy all of the essential requirements. As such, any unnecessary data migration can be prevented from being performed, and any necessary data migration can be performed without fail.

Second Embodiment

Figure 23:
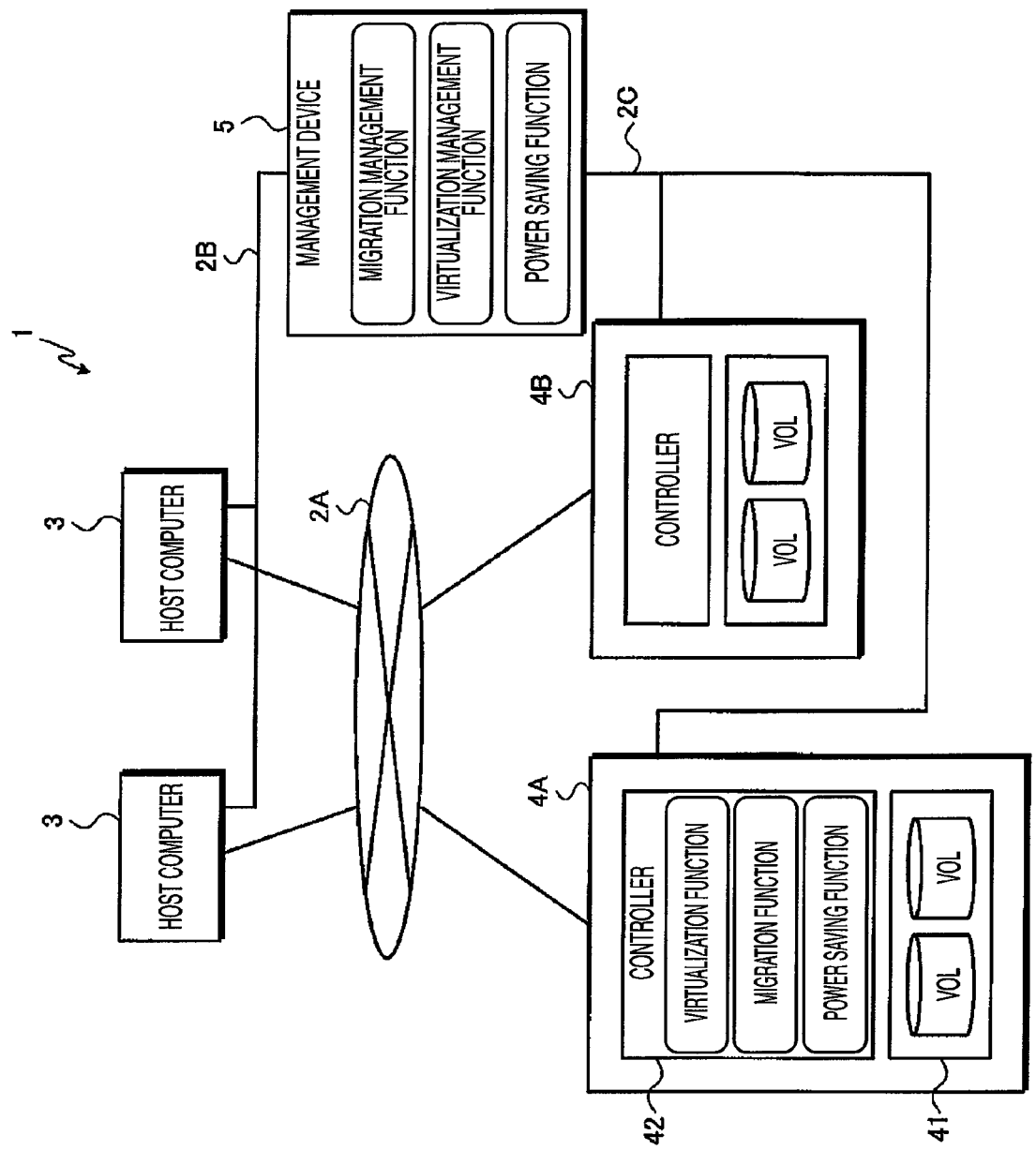
FIG. 23 is a block diagram showing the configuration of a computer system in a second embodiment of the invention.

FIG. 23 is a block diagram showing the configuration of a computer system in a second embodiment of the invention. As shown in FIG. 23, the computer system 1 of this embodiment is configured to include first and second storage subsystems 4A and 4B. The second storage subsystem 4B serves as an external-connected storage, i.e., virtual storage, of the first storage subsystem 4A. This is the difference from the first embodiment.

The first storage subsystem 4A is connected to the second storage subsystem 4B over the network 2A. The first storage subsystem 4A provides, with a virtualization function, to the host computer(s) 3, volumes provided by the second storage subsystem 4B as if they are its own. Such volumes are referred to as virtual volumes. The first storage subsystem 4A is also provided with a power saving function of performing power saving control over hard disk drives configuring the volumes.

The second storage subsystem 4B may have the same configuration and function as the storage subsystem 4 described in the first embodiment, or may have the same configuration and function as the first storage subsystem 4A of this embodiment.

Figure 24:
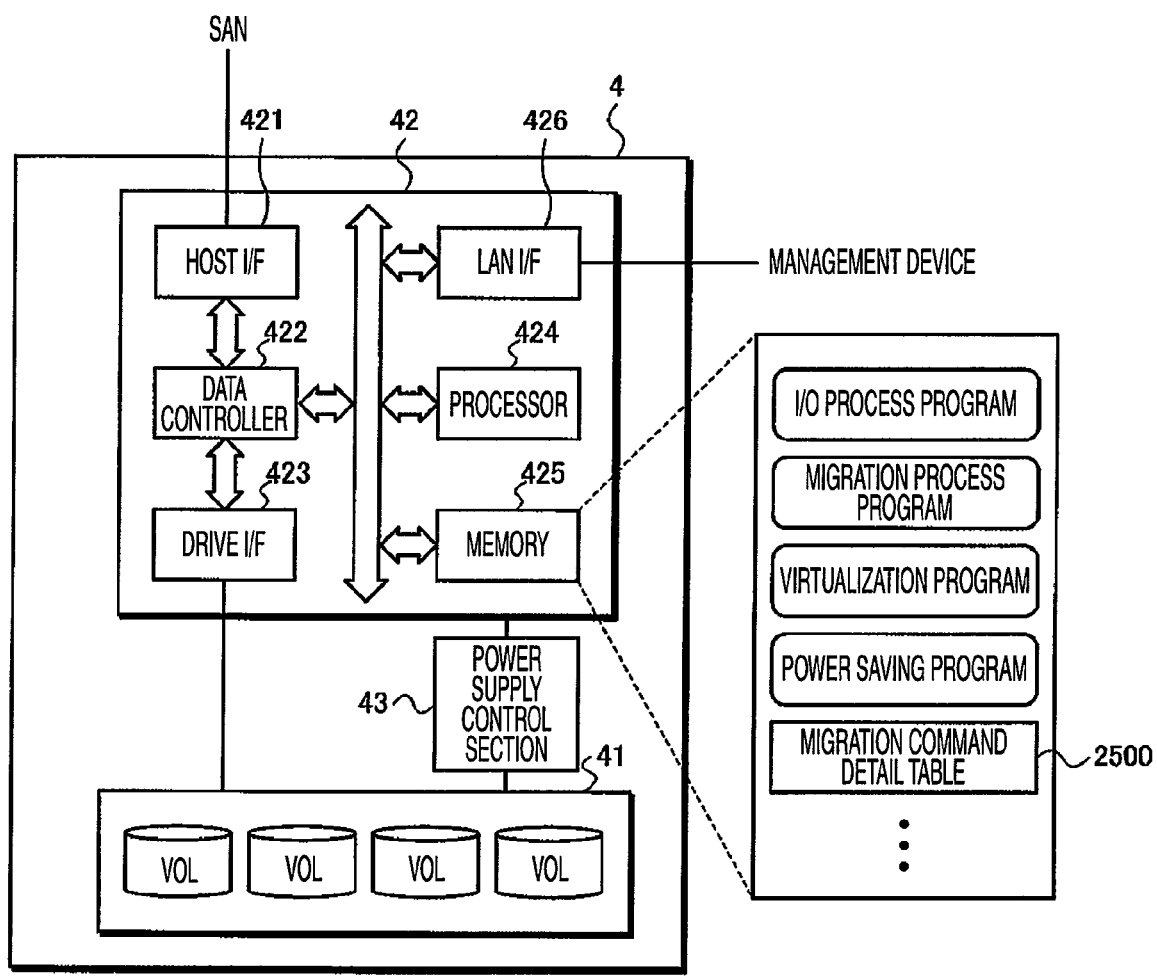
FIG. 24 is a block diagram showing the configuration of a storage subsystem in the second embodiment of the invention.

FIG. 24 is a block diagram showing the configuration of the storage subsystems 4A and 4B in the second embodiment of the invention. In FIG. 24, the first storage subsystem 4A explicitly includes a power supply control section 43. The memory unit 425 stores various programs and a migration command detail table 2500, i.e., an I/O process program, a migration process program, a virtualization program, and a power saving program. Similarly to the first embodiment, the processor 424 of the controller 42 runs such various programs.

The power saving program serves to control over the power supply control section 43, whereby the power consumption is controlled over the disk array 41 in its entirety, or each of the hard disk drives, and the controller 42, for example. After completion of power consumption control over the hard disk drives and the controller 42 as such, the power saving program notifies the management device 5 of the state of power supply.

The virtualization program is for implementing the virtualization function. To be specific, in the virtualization program, volumes in the second storage subsystem 4B connected to the first storage subsystem 4A over the network 2A are mapped to volumes in the first storage subsystem 4A, thereby providing the volumes of the second storage subsystem 4B to the host computer(s) 3 as the volumes of the first storage subsystem 4A. In this embodiment, for example, the virtualization function described in JP-A-2004-5370 and that described in JP-A-2005-250925 can be used. Alternatively, the virtualization function may be implemented by any device configuring the network 2A, e.g., FC (Fibre Channel) switch. The first and second storage subsystems 4A and 4B may have a one-to-one relationship or a one-to-many relationship.

Figures 25, 26:
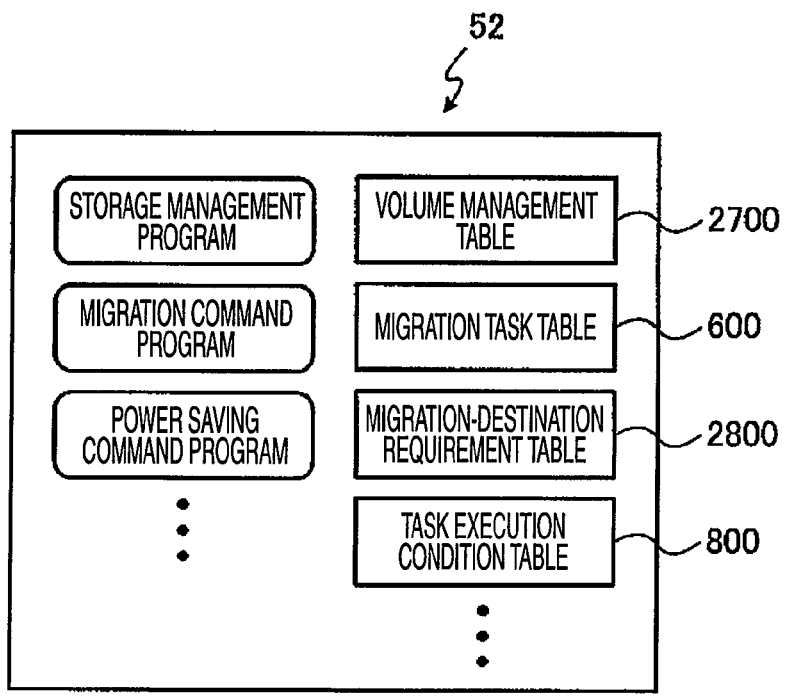
FIG. 25 is a diagram showing an exemplary migration command detail table in the storage subsystem of the second embodiment of the invention.
FIG. 26 is a diagram showing exemplary memory contents in a management device of the second embodiment of the invention.

FIG. 25 is a diagram showing an exemplary migration command detail table 2500 in the storage subsystem 4 of the second embodiment of the invention. Compared with the migration command detail table 300 in the first embodiment, the difference of the migration command detail table 2500 in this embodiment lies in the respect that a power-saving Yes or No field 2501 is additionally included. The power-saving Yes or No field 2501 is a flag for use to determine whether a power saving mode is set or not. When the power-saving Yes or No field 2501 shows "Yes", after the completion of the migration process, the power saving program changes the power supply state of the hard disk drive(s) configuring the migration-destination volume into a power saving mode, e.g., state of sleep.

FIG. 26 is a diagram showing exemplary contents of the memory 52 in the management device 5 of the second embodiment of the invention. As shown in FIG. 26, the memory 52 of the management device 5 stores also a power saving command program. Such a power saving command program issues a command for setting of a power saving mode to the storage subsystem 4 having the power saving function, i.e., the storage subsystem 4 in which the power saving program is installed.

A volume management table 2700 and a migration-destination requirement table 2800 are each so configured as to be suitable for the second embodiment.

FIG. 27 is a diagram showing an exemplary volume management table 2700 in the management device 5 of the second embodiment of the invention. As shown in FIG. 27, the volume management table 2700 of this embodiment is additionally provided with a virtualized device ID 2701, and a power saving function Yes or NO field 2702.

The virtualized device ID 2701 is an identifier for uniquely identifying the second storage subsystem 4B for providing a virtualized volume by the virtualization program. The power saving function Yes or NO field 2702 is information indicating whether the first storage subsystem 4A (or the second storage subsystem 4B) has the power saving function of setting a sleep mode to the power supply state of the hard disk drive(s) configuring the volume, or putting the power supply state thereof back to a normal mode.

FIG. 28 is a diagram showing an exemplary migration-destination requirement table 2800 in the management device 5 of the second embodiment of the invention. As shown in FIG. 28, the migration-destination requirement table 2800 of this embodiment includes requirements about the power saving function in the migration-destination requirement 702. In this example, the "requirement 2" in the migration-destination requirement ID 701 includes not only "disk type=FC" but also "power saving function Yes or No=Yes", and "power saving Yes or No=Yes".

Described next is the process to be executed by the management device 5 of this embodiment. In this embodiment, because the migration-destination requirement 702 is additionally provided with a requirement related to the power saving control, the difference from the first embodiment lies in the volume search process (refer to FIGS. 14 and 15), and the follow-up process after the migration process (refer to FIG. 19).

Figure 29:
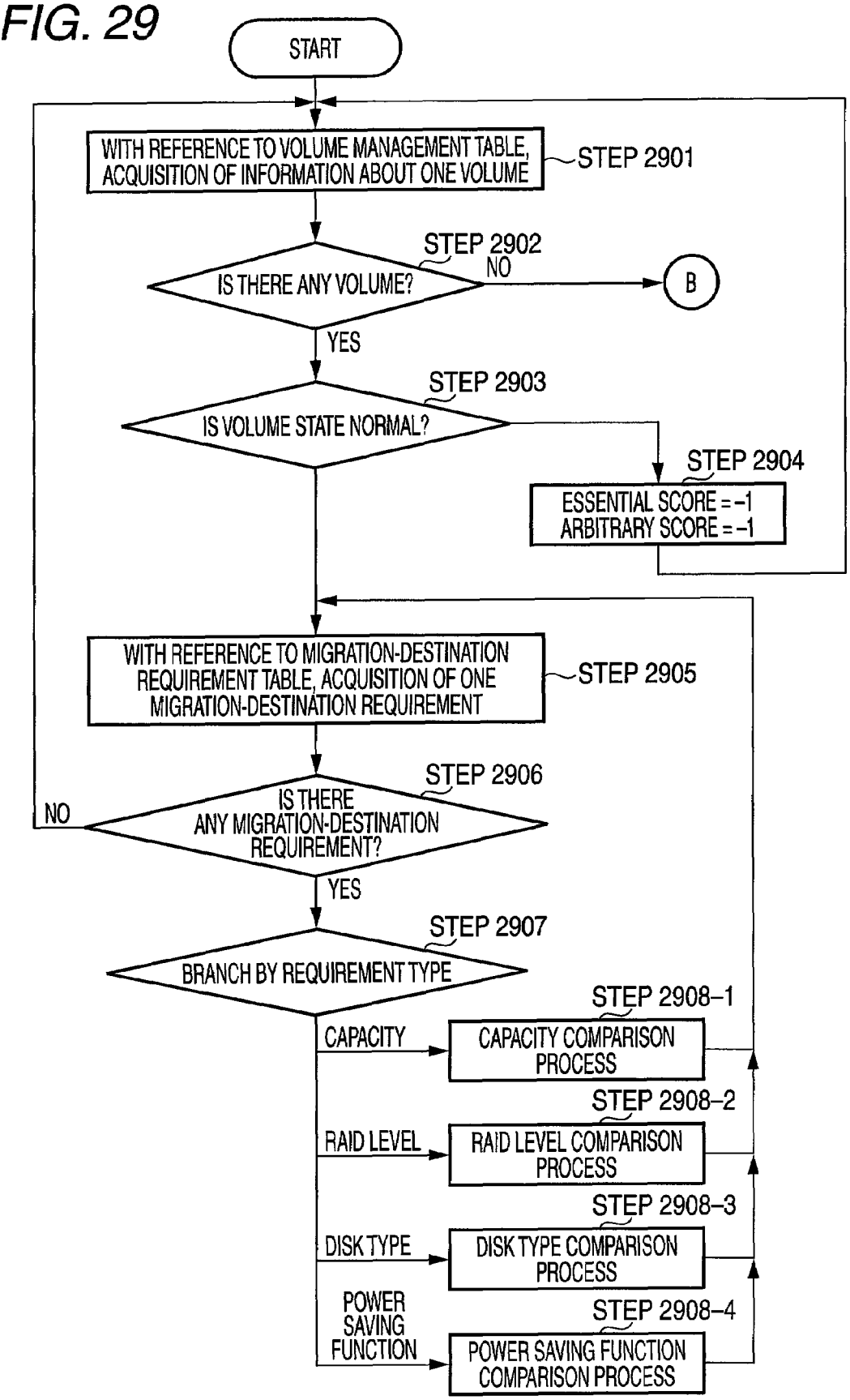
FIG. 29 is a flowchart of a volume search process to be executed by the management device in the second embodiment of the invention.

FIG. 29 is a flowchart of the volume search process to be executed by the management device 5 in the second embodiment of the invention. Compared with the flowchart of FIG. 14, the volume search process of FIG. 29 is different therefrom that, after the branch determination by the requirement type (STEP 2907), a power saving function comparison process (STEP 2908-4) is additionally provided. When the requirement in the migration-destination requirement 702 is related to the "power saving function", the management device executes the power saving function comparison process (STEP 2908-4). The remaining is the same as the volume search process of FIG. 14 described above, and is not described again.

Figure 30:
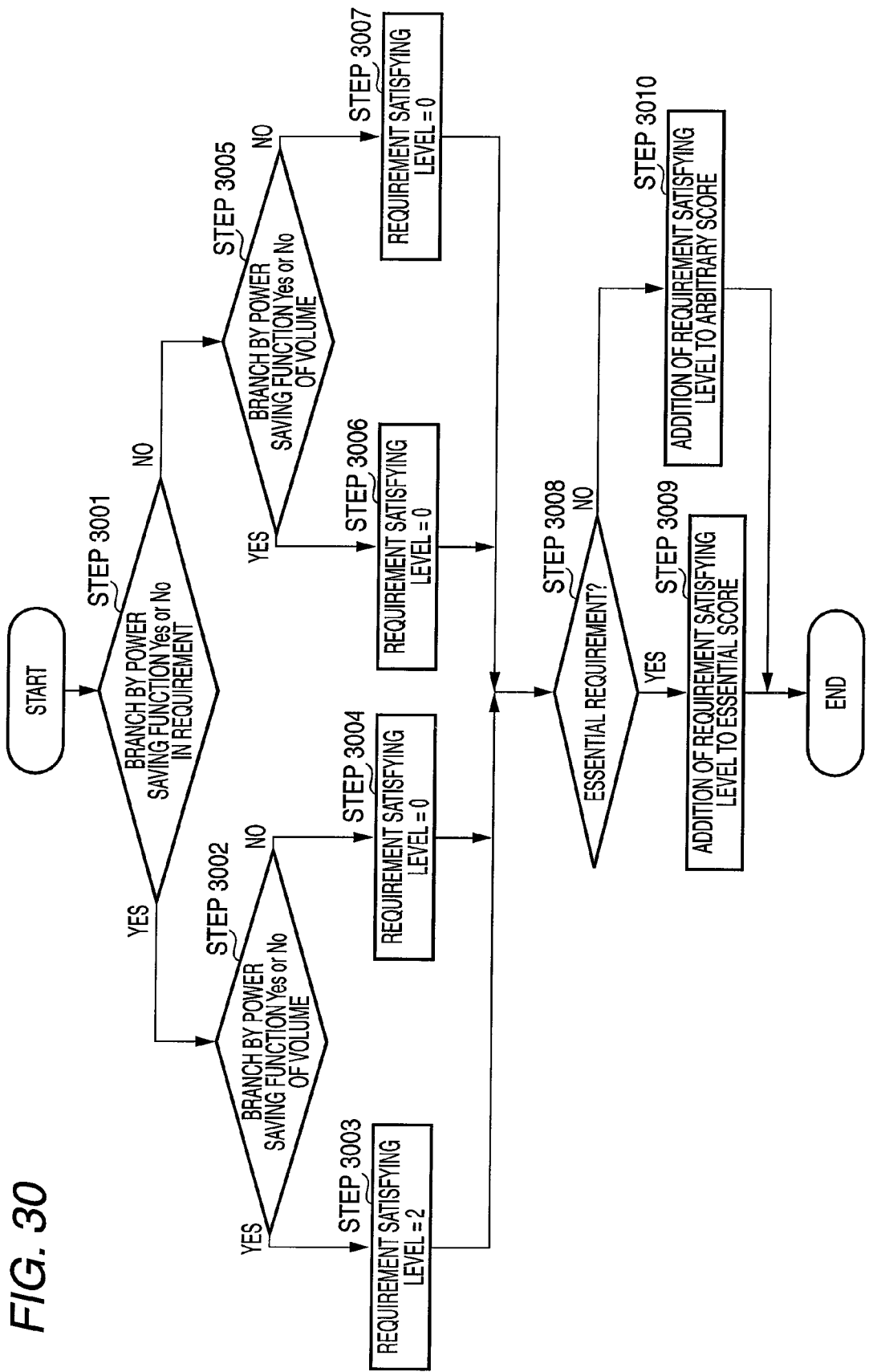
FIG. 30 is a flowchart of a power saving function comparison process in STEP 2908-4 of FIG. 29.

FIG. 30 is a flowchart of the power saving function comparison process in STEP 2908-4 of FIG. 29.

As shown in FIG. 30, first of all, the management device 5 determines whether the requirement selected from the migration-destination requirement 702 in the migration-destination requirement table 2800 is about the power saving function or not (STEP 3001). That is, when determining that the requirement selected in the migration-destination requirement 702 shows "Yes" in the power saving function Yes or No field 2702, the management device 5 then determines whether the volume selected in the volume management table 500 shows "Yes" or "No" in the power saving function Yes or No field 2702 (STEP 3002). When determining that the selected volume shows "Yes" in the power saving function Yes or No field 2702, the management device 5 sets "2" to the requirement satisfying level (STEP 3003). On the other hand, when determining that the selected volume shows "No" in the power saving function Yes or No field 2702, the management device 5 sets "0" to the requirement satisfying level (STEP 3004).

On the other hand, when determining that the requirement selected in the migration-destination requirement 702 shows "No" in the power saving function Yes or No field 2702, the management device 5 then determines whether the volume selected in the volume management table 500 shows "Yes" or "No" in the power saving function Yes or No field 2702 (STEP 3005). When determining that the selected volume shows "No" in the power saving function Yes or No field 2702, the management device 5 sets "2" to the requirement satisfying level (STEP 3006). On the other hand, when determining that the selected volume shows "Yes" in the power saving function Yes or No field 2702, the management device 5 sets "1" to the requirement satisfying level (STEP 3007).

The management device 5 refers to the essential flag 703 for the corresponding entry in the migration-destination requirement table 700, and determines whether the selected migration-destination requirement is essential or not (STEP 3008). When determining that the selected migration-destination requirement is essential (Yes in STEP 3008), the management device 5 adds the corresponding value of the requirement satisfying level to the essential score (STEP 3009). On the other hand, when determining that the selected migration-destination requirement is not essential, i.e., is arbitrary (No in STEP 3008), the management device 5 adds the corresponding value of the requirement satisfying level to the arbitrary score (STEP 3010).

Figure 31:
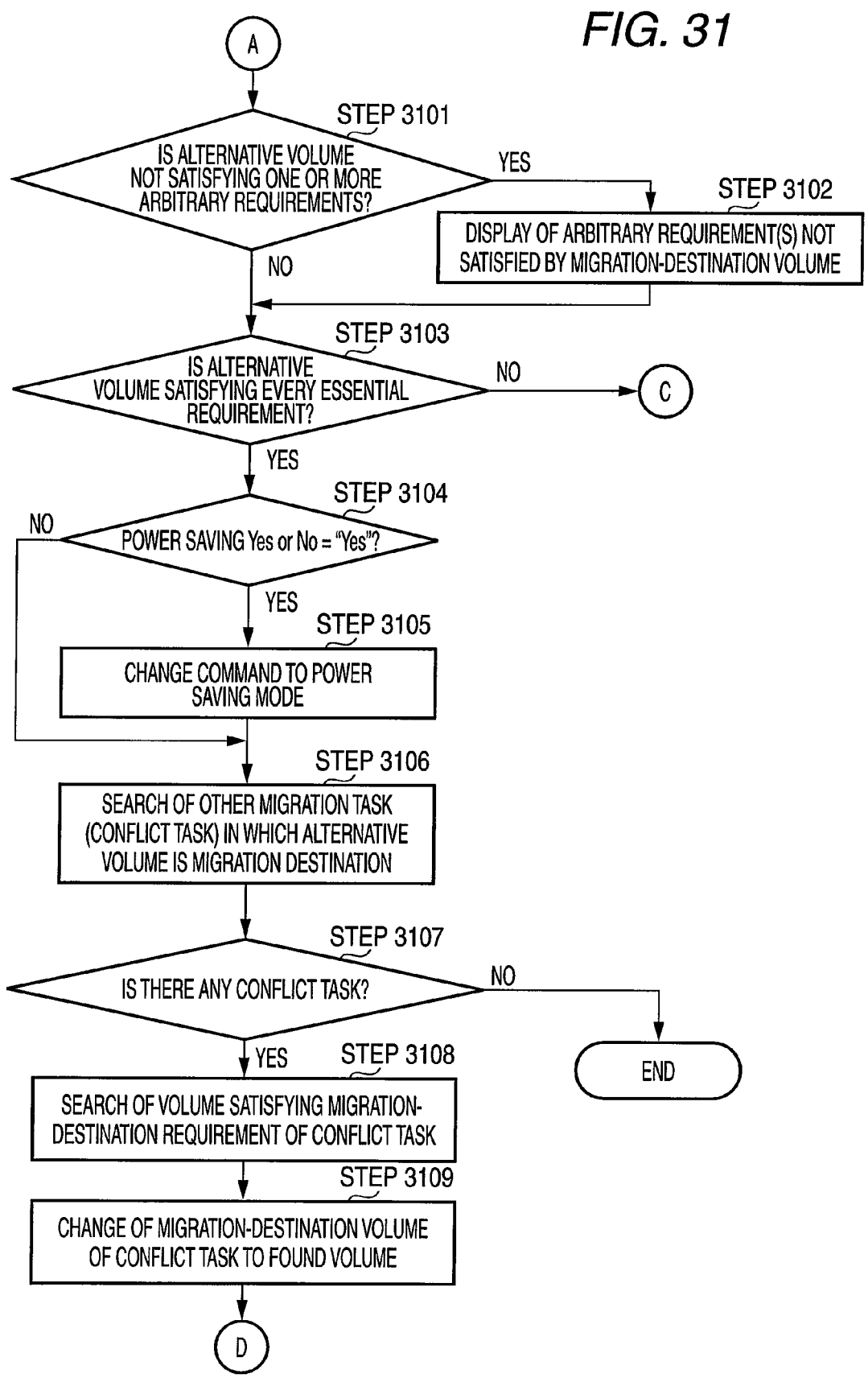
FIG. 31 is a flowchart of a migration task management process to be executed by the management device in the second embodiment of the invention.

FIG. 31 is a flowchart of the migration task management process to be executed by the management device 5 in the second embodiment of the invention, and the process is corresponding to the follow-up process after the migration process of FIG. 19 described in the first embodiment. FIG. 31 additionally shows processes in STEP 3104 and STEP 3105, which is the difference from the flowchart of FIG. 19.

That is, the management device 5 determines whether the volume newly selected as a migration destination, i.e., alternative volume, is not satisfying one or more of the arbitrary requirements in the migration-destination requirement table 700 (STEP 3101). When determining that the alternative volume is not satisfying one or more of the arbitrary requirements in the migration-destination requirement table 700 (Yes in STEP 3101), the management device 5 displays, to the system manager, a warning screen including a list of the arbitrary requirements not satisfied by the alternative volume (STEP 3102).

The management device 5 then determines whether or not the alternative volume is satisfying all of the essential requirements in the migration-destination requirement table 700 (STEP 3103). When the management device 5 determines that the alternative volume is not satisfying all of the essential requirements (No in STEP 3103), the procedure goes to the process of FIG. 21 similarly in the first embodiment.

When determining that the alternative volume is satisfying all of the essential requirements (Yes in STEP 3103), the management device 5 refers to the command detail table 2500, and determines whether the power saving Yes or No field 2501 is "Yes" for the migration-source volume (STEP 3104). When determining that the power saving Yes or No field 2501 is "Yes" (Yes in STEP 3104), with respect to the storage subsystem 4 including the migration-source volume, the management device 5 issues a command for a mode change, into the power saving mode, of the hard disk device(s) configuring the migration-source volume (STEP 3105). In response thereto, under the control of the power supply control section 43, the controller 42 of the storage subsystem 4 goes through the mode change, into the power saving mode, of the hard disk drive(s) configuring the migration-source volume. Herein, such a mode change is not restrictively performed to the hard disk drives. For example, when the volume is configured by the hard disk drives all belonging to the second storage subsystem 4B, the second storage subsystem 4B can be changed in mode to power saving in its entirety. Instead of changing the second storage subsystem 4B in its entirety to the power saving mode, only the controller 42 may be changed in mode to power saving.

Thereafter, the management device 5 searches and specifies any conflict task in which the alternative volume is a migration destination. When any conflict task as such is found, the management device 5 searches and specifies still any other volume satisfying the migration-destination requirement(s) of the conflict task, and changes the migration-destination volume of the conflict task to thus specified volume (STEP 3106 to STEP 3109). These processes are the same as those corresponding in FIG. 19.

As such, in the second embodiment, when the alternative volume is satisfying all of the essential requirements after data migration from the migration-source volume to the alternative volume, it means no more data migration is required. As such, the hardware resources configuring the migration-source volume can be set in a power saving mode, thereby favorably being able to suppress low the power consumption.

Third Embodiment

A third embodiment is characterized in that, when there is any conflict task in which an alternative volume is a migration destination, data on the alternative volume is migrated to another volume, thereby being able to avoid any possible conflict with migration tasks.

Figure 32:
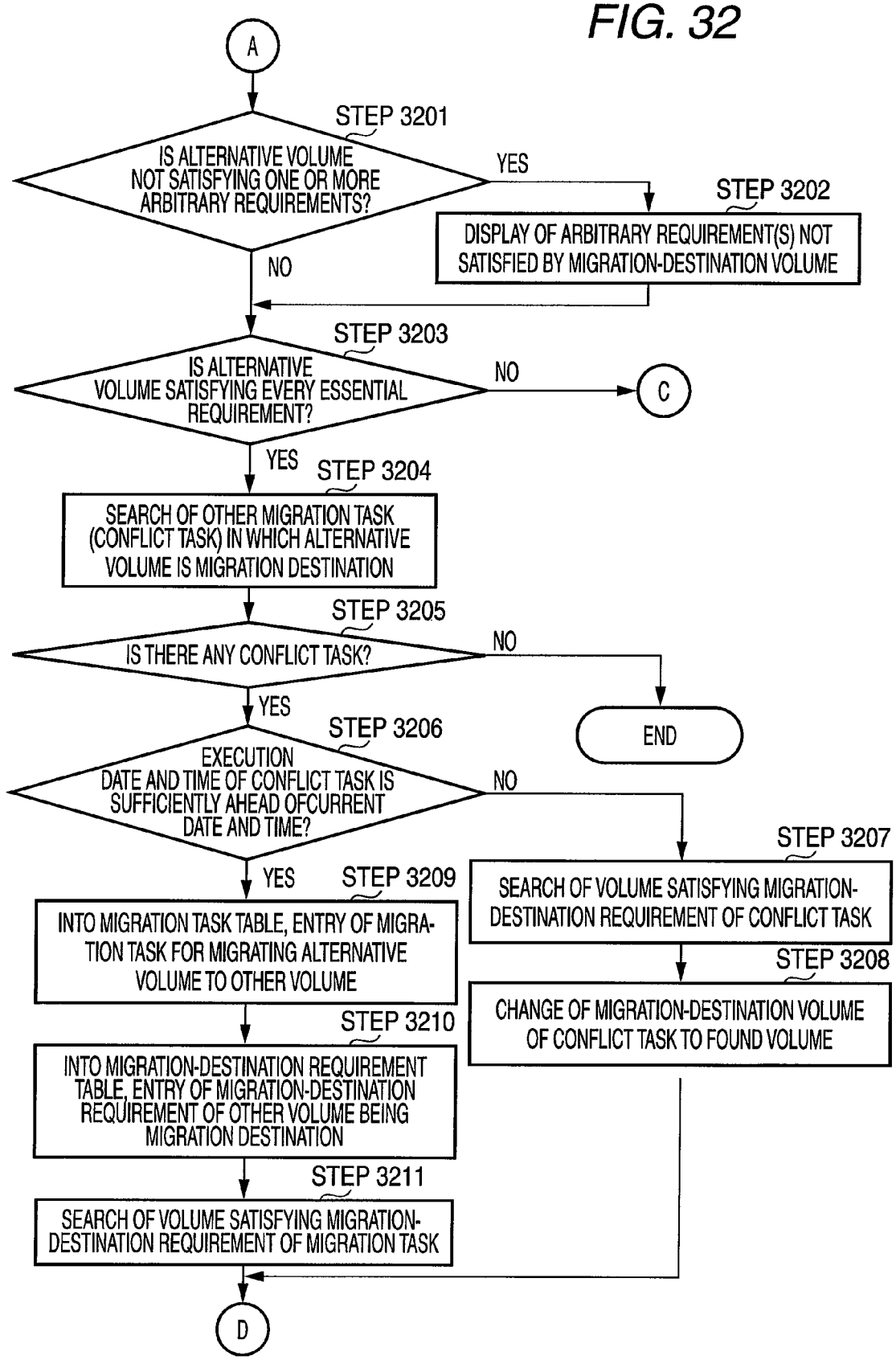
FIG. 32 is a flowchart of a migration task management process to be executed by a management device in a third embodiment of the invention.

FIG. 32 is a flowchart of the migration task management process to be executed by the management device 5 in the third embodiment of the invention. Compared with the flowchart of FIG. 19, in FIG. 32, the processes after the process of conflict task search (STEP 3206 to STEP 3211) are different.

That is, the management device 5 determines whether the volume newly selected as a migration destination, i.e., alternative volume, is not satisfying one or more of the arbitrary requirements in the migration-destination requirement table 700 (STEP 3201). When determining that the alternative volume is not satisfying one or more of the arbitrary requirements in the migration-destination requirement table 700 (Yes in STEP 3201), the management device 5 displays, to the system manager, a warning screen including a list of the arbitrary requirements not satisfied by the alternative volume (STEP 3202).

The management device 5 then determines whether or not the alternative volume is satisfying all of the essential requirements in the migration-destination requirement table 700 (STEP 3203). When the management device 5 determines that the alternative volume is not satisfying all of the essential requirements (No in STEP 3203), the procedure goes to the process of FIG. 21.

When determining that the alternative volume is satisfying all of the essential requirements (Yes in STEP 3203), the management device 5 refers to the migration task table 600, and searches and specifies any other migration task in which the alternative volume is a migration destination (hereinafter, the resulting task is referred to as "conflict task") (STEP 3204). That is, in response to the change of the migration-destination volume, a search is made whether there is any migration task in which any conflict is observed with thus changed migration-destination volume. When the management device 5 determines that there is no such conflict task (No in STEP 3205), this is the end of the data migration process.

When determining that there is such a conflict task (Yes in STEP 3205), the management device 5 refers to the migration task table 600, and determines whether there is a predetermined time interval between the task execution date and time 607 for the conflict task (STEP 3206) and the current date and time. The predetermined time interval can be set arbitrarily by the system manager, and preferably, is ahead in time practically sufficiently. The predetermined time interval is set for use as a reference such as five hours or a day, for example. Alternatively, the management device 5 may store, as a history, information about the migration process executed in the past, i.e., the relationship between the volume capacity and the time taken for the migration process. The management device 5 thus may estimate the time needed for the migration process based on the history, and may make a determination by using the estimated time as a reference.

When determining that the time interval is not long as a predetermined value (No in STEP 3206), the management device 5 refers to the migration-destination requirement table 700, and searches and specifies any volume satisfying the migration-destination requirement(s) of the conflict task (STEP 3207). The management device 5 also refers to the volume management table 500 and the migration task table 600, and changes the migration destination for the volume in the conflict task to thus specified volume (STEP 3208).

On the other hand, when determining that the time interval is long as a predetermined value (Yes in STEP 3206), the management device 5 enters, into the migration task table 600, the migration task of migrating the alternative volume to any other volume, and enters the migration-destination requirement(s) therefor into the migration-destination requirement table 700. To be specific, the management device 5 enters, into the migration-source device ID 602 and the migration-source LUN 603 in the migration task table 600, the device ID of the storage subsystem including the alternative volume and the LUN of the alternative volume (STEP 3209). The management device 5 also enters, into the migration-destination requirement ID 604, the identifier of the migration-destination requirement used for searching the alternative volume (STEP 3210). In this case, into the migration-destination device ID 605 and the migration-destination LUN 606, entered is the information indicating that the migration-destination volume is not yet determined, e.g., hyphen ("-").

The management device 5 then refers to the volume management table 500 and the migration-destination requirement table 700, and searches and specifies any volume satisfying the migration-destination requirement(s) of the migration task (STEP 3211). After the process in STEP 3211, the procedure then goes to the process of FIG. 12.

As such, in the third embodiment, when there is a conflict task in which an alternative volume is a migration destination, data on the alternative volume is migrated to any other volume, thereby being able to avoid any possible conflict of the migration tasks. Especially, in the third embodiment, when there is enough time interval until the execution date and time for the conflict task, the data on the alternative volume may be migrated also to any other volume, and when the time interval is not that long, data on the migration-destination volume of the conflict task is migrated to the alternative volume, thereby being able to perform the migration process with flexibility and efficiency.

Other Embodiments

While the invention has been described in detail, the foregoing description is in all aspects illustrative and not restrictive. It is understood that numerous other modifications and variations can be devised without departing from the scope of the invention. For example, in the above embodiments, the processes of various programs are described in a sequential manner, but this is surely not restrictive. As such, as long as no contradiction occurs to the process result, the process order may be changed or the processes may be executed at the same time.

Moreover, in the specification, various types of information are described in the table format, but this is surely not restrictive. Such various types of information may include group of data, and may be of the data configuration other than the table.

The present invention can be widely applicable to a storage subsystem utilizing the data migration technology.

What is claimed is:

1. A storage system, comprising:
   at least one storage subsystem that provides a data storage service to a host computer, having a disk array including a plurality of hard disk drives forming a plurality of logical volumes and a controller that controls an access to the disk array based on an access request coming from the host computer; and
   a management device that manages the at least one storage subsystem, having migration task information including a first task defining data migration from a first logical volume being any one of the plurality of logical volumes to a second logical volume being any other one of the plurality of logical volumes and migration-destination requirement information including at least one migration-destination requirement about the first task,
   wherein the management device issues a first request for executing the first task to a first controller of the at least one storage subsystem including the first logical volume, in accordance with the first task found in the migration task information,
   wherein the management device selects a third logical volume from the plurality of logical volumes for a replacement of the second logical volume based on the migration-destination requirement information, when the first task is abnormally completed by the first controller,
   wherein the management device enters a second task defining data migration from the first to third logical volume into the migration task information,
   wherein the management device issues a second request for executing the second task to the controller of the at least one storage subsystem including the first logical volume, in accordance with the second task found in the migration task information,
   wherein the at least one migration-destination requirement is either an essential requirement or an arbitrary requirement,
   wherein the management device stores a third task defining data migration from a fourth logical volume being any one of the plurality of logical volumes to the third logical volume being any other one of the plurality of logical volumes, into the migration task information,
   wherein the management device specifies the third task as a conflict task based on the migration task information, when the third logical volume is satisfying all of the essential requirements found in the migration-destination requirement information,
   wherein the management device selects a fifth logical volume satisfying a migration-destination requirement about the conflict task from the plurality of logical volumes, and
   wherein the management device changes a migration destination for data in the conflict task to the selected fifth logical volume.

2. A storage system, comprising:
   at least one storage subsystem that provides a data storage service to a host computer, having a disk array including a plurality of hard disk drives forming a plurality of logical volumes and a controller that controls an access to the disk array based on an access request coming from the host computer; and
   a management device that manages the at least one storage subsystem, having migration task information including a first task defining data migration from a first logical volume being any one of the plurality of logical volumes to a second logical volume being any other one of the plurality of logical volumes and migration-destination requirement information including at least one migration-destination requirement about the first task,
   wherein the management device issues a first request for executing the first task to a first controller of the at least one storage subsystem including the first logical volume, in accordance with the first task found in the migration task information,
   wherein the management device selects a third logical volume from the plurality of logical volumes for a replacement of the second logical volume based on the migration-destination requirement information, when the first task is abnormally completed by the first controller,
   wherein the management device enters a second task defining data migration from the first to third logical volume into the migration task information,
   wherein the management device issues a second request for executing the second task to the controller of the at least one storage subsystem including the first logical volume, in accordance with the second task found in the migration task information,
   wherein the at least one migration-destination requirement is either an essential requirement or an arbitrary requirement,
   wherein the management device specifies the task defining data migration to the third logical volume as a conflict task based on the migration task information, when determining that the third logical volume is satisfying all of the essential requirements found in the migration-destination requirement table,
   wherein the management device selects a fourth logical volume satisfying a migration-destination requirement for the conflict task from the plurality of logical volumes, and
   wherein the management device enters a task defining data migration from the third logical volume to the selected fourth logical volume into the migration task table.

* * * * *